US006899751B2

(12) United States Patent
Arita et al.

(10) Patent No.: US 6,899,751 B2
(45) Date of Patent: May 31, 2005

(54) INK FOR INK JET RECORDING, INK JET RECORDING METHOD, INK CARTRIDGE AND INK JET RECORDING APPARATUS

(75) Inventors: Hitoshi Arita, Ohta-ku (JP); Nobutaka Osada, Ohta-ku (JP); Kiyofumi Nagai, Ohta-ku (JP); Kakuji Murakami, Ohta-ku (JP); Akihiko Gotoh, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 203 days.

(21) Appl. No.: 09/966,907

(22) Filed: Oct. 1, 2001

(65) Prior Publication Data

US 2002/0083866 A1 Jul. 4, 2002

(30) Foreign Application Priority Data

Sep. 29, 2000 (JP) ........................................ 2000-299728
Jan. 10, 2001 (JP) ........................................ 2001-003082

(51) Int. Cl.$^7$ ............................ C09D 11/00; G01D 11/00
(52) U.S. Cl. ..................... 106/31.27; 106/31.6; 347/100
(58) Field of Search .............................. 106/31.27, 31.6; 347/100

(56) References Cited

U.S. PATENT DOCUMENTS

| | | | |
|---|---|---|---|
| 4,554,555 A | | 11/1985 | Aruga et al. |
| 4,588,998 A | * | 5/1986 | Yamamuro et al. ........... 347/68 |
| 4,620,876 A | | 11/1986 | Fujii et al. |
| 4,700,203 A | * | 10/1987 | Yamamuro et al. ........... 347/68 |
| 4,994,110 A | * | 2/1991 | Stoffel et al. ............. 106/31.58 |
| 5,431,720 A | * | 7/1995 | Nagai et al. ............. 106/31.43 |
| 5,462,592 A | * | 10/1995 | Murakami et al. ....... 106/31.43 |
| 5,514,208 A | * | 5/1996 | Nagai et al. ............. 106/31.43 |
| 5,605,566 A | * | 2/1997 | Yui et al. ................. 106/31.58 |
| 5,622,550 A | | 4/1997 | Konishi et al. |
| 5,637,138 A | * | 6/1997 | Yamazaki ................. 106/31.32 |

(Continued)

FOREIGN PATENT DOCUMENTS

| | | |
|---|---|---|
| JP | 62-149770 | 3/1987 |
| JP | 63-048374 | 3/1988 |
| JP | 5-155023 | 6/1993 |
| JP | 5-331391 | 12/1993 |
| JP | 8-333542 | 12/1996 |
| JP | 9-025441 | 1/1997 |
| JP | 9-123437 | 5/1997 |
| WO | WO 98/42513 | 10/1998 |

*Primary Examiner*—Mark L. Bell
*Assistant Examiner*—Veronica F. Faison
(74) *Attorney, Agent, or Firm*—Oblon, Spivak, McClelland, Maier & Neustadt, P.C.

(57) ABSTRACT

An ink for ink jet recording which is used for an ink jet printer in which at least a portion of a member being in contact with the ink is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, wherein a corrosion inhibitor is contained, and a phosphonium ion represented by the general formula (Formula 1) described below is contained:

[Formula 1]

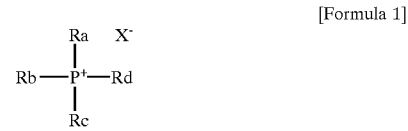

(wherein in Formula 1, Ra, Rb, Rc and Rd represent a linear, branched, or cyclic alkyl group having 1 to 4 carbon atoms, a hydroxyalkyl group, a halogenated alkyl group and a substituted or non substituted phenyl group, and $X^-$ represents a counter ion) is provided.

29 Claims, 3 Drawing Sheets

U.S. PATENT DOCUMENTS

| | | | |
|---|---|---|---|
| 5,810,915 A | * 9/1998 | Nagai et al. | 106/31.43 |
| 5,879,439 A | * 3/1999 | Nagai et al. | 106/31.28 |
| 5,882,390 A | * 3/1999 | Nagai et al. | 106/31.49 |
| 6,120,589 A | * 9/2000 | Bannai et al. | 106/31.27 |
| 6,261,349 B1 | 7/2001 | Nagai et al. | |
| 6,613,136 B1 | * 9/2003 | Arita et al. | 106/31.58 |
| 6,637,875 B2 | * 10/2003 | Kaneko et al. | 347/100 |
| 2001/0025690 A1 | * 10/2001 | DeLouise et al. | 156/334 |
| 2002/0096085 A1 | * 7/2002 | Gotoh et al. | 106/31.86 |
| 2002/0135650 A1 | * 9/2002 | Nagai et al. | 347/100 |
| 2003/0010252 A1 | * 1/2003 | Arita et al. | 106/31.27 |
| 2003/0038869 A1 | * 2/2003 | Kaneko et al. | 347/100 |

* cited by examiner

INK FOR INK JET RECORDING, INK JET RECORDING METHOD, INK CARTRIDGE AND INK JET RECORDING APPARATUS

FIELD OF THE INVENTION

The present invention relates to an ink used for an ink jet printer in which at least a portion of a member being in contact with the ink is formed by a glass, particularly any one of a borosilicate glass, a soda lime glass, a photosensitive glass, single crystal silicon, polysilicon, a silicon oxide film, a titanium nitride film, a zirconium film, a titanium oxide film, and a silicon nitride film; and an ink jet recording method, an ink cartridge and an ink jet recording apparatus.

BACKGROUND OF THE INVENTION

An ink jet recording system has been recently spread abruptly because of advantages that a main body is small, low price, and low running cost. Accordingly, an ink jet printer capable of printing on non coated papers such as a transcription paper for electrophotography, a printing blank, a typewriter blank, a wire dot printer blank, a word processor blank, a letter blank, a report blank and the like is also put into the market.

There is an ink jet printer in which a glass, or silicon and silicon oxide on the glass is further used from the viewpoints of easy fine processing, processing precision, and the like, among ink jet printers.

An ink used for such ink jet printer is usually composed of a coloring agent which is dissolved or dispersed in a solvent and a wetting agent; a polyhydric alcohol or ethers thereof with a solvent, and according to requirement, contains a penetrant, a fungicide, a preservative, a dispersant and the like. However, when the ink is filled up in the above-mentioned ink jet printer in which a glass, or silicon and silicon oxide on the glass was further used and used or left alone for long time, a glass, or further silicon and silicon oxide which are in contact with the ink is eluted.

Accordingly, the design precision of the ink jet printer is lost, the size of ink drops and the discharge speed of the ink drops are changed, the quality of an image is lowered, and discharge inferiority occurs in the worst case. A conjunction strength is lowered caused by the elution of a glass or further silicon and silicon oxide at a conjunction part, the discharge inferiority occurs, and the conjunction part is peeled out in the worst case to be troubled. In particular, in case of an ink jet printer in which a liquid chamber part is composed of a glass or silicon and silicon oxide, since the dimension precision of the liquid chamber part which requires precision is lowered, the above-mentioned problems occur remarkably.

Further, in case of an ink jet printer in which a fluid resistance is composed of a glass or silicon and silicon oxide, the fluid resistance is lowered because of the elution of a glass or further silicon and silicon oxide. Accordingly, the size of ink drops and the discharge speed of the ink drops are remarkably changed, the quality of an image is lowered, and the discharge inferiority occurs in the worst case.

Further, in case of an ink jet printer in which a vibration plate is composed of a glass or silicon and silicon oxide, the thickness of the vibration plate is lowered. Accordingly, the size of ink drops and the discharge speed of the ink drops are changed, the discharge inferiority occurs, the quality of an image is lowered, and the vibration plate is finally made thin and destroyed without enduring vibration.

Further, in case of an ink jet printer in which a nozzle is composed of a glass or silicon and silicon oxide, since the diameter of the nozzle is enlarged, the size of ink drops and the discharge speed of the ink drops are changed, the discharge inferiority occurs, and the quality of an image is lowered.

On the other hand, in case of an ink in which a glass or silicon and silicon oxide was eluted, the solubility or dispersibility of a coloring agent is lowered, and the clogging and the like caused by the precipitation of the coloring agent are provoked. Further, the glass or silicon and silicon oxide itself which was eluted reaches a supersaturated state because of evaporation of a solvent such as water or the like, is precipitated at a nozzle surface and the like, and clogging is provoked. Since these problems are not solved at status quo, for example, a head is also simultaneously exchanged when an ink which was preliminarily filled up was exhausted, and the like, and it was used only for comparatively short period.

As ink jet printers for solving these problems, there is a method of prevention by providing a layer of an organic material and an inorganic material such as SiN, TiN, TiO or the like on a glass or silicon and silicon oxide, as described in Japanese Patent Application Laid-open Publications Hei No. 5-155023, WO98-42513 and the like. This method has an effect of preventing the elution of a glass or silicon and silicon oxide, but since production steps are increased, it needs a robust cost, and causes a very precious ink jet printer. Further, these films tend to generate pinholes, it is difficult to uniformly form the film, and defects occur often. Further, according to the system and structure of the head, there is occasionally a case of being unable to take the formation of the film itself in steps. Further, according to a recent experiment, even if these layers are provided, it has been clarified that a certain dye of a black dye cannot prevent the elution, and it is also confirmed that the elution exceeding the specification value occurs in other coloring agents.

There is proposed a method of preventing the elution by adding urea in an ink and dissolving stably a glass or silicon and silicon oxide in the ink even if it is eluted, as the ink in Japanese Patent Application Laid-open Publications Hei No. 9-123437. However, since even this method does not prevent the elution of a glass or silicon and silicon oxide it self, it cannot be applied to a part to which precision is required.

Accordingly, required is an ink, which is not eluted even on a substrate, in which a layer of silicon oxide whose film can be comparatively easily formed by a glass or silicon and silicon oxide, and further by an organic material and an inorganic material such as SiN, TiN, TiO or the like is provided on a glass or silicon and silicon oxide.

An ink in which the content of sodium ion is prescribed is described in Japanese Patent Application Publications Hei No. 7-51687. Further, the contents of sodium ion and potassium ion are prescribed in Japanese Patent Application Laid-open Publications Hei No. 5-331391, and similarly, inks in which the contents of sodium ion and potassium ion are respectively prescribed are described in Japanese Patent Application Laid-open Publications No. 333542 and No. 9-25441.

Further, the present inventor proposes an ink which contains a specific dye and a quaternary ammonium as its counter ion in the ink in Japanese Patent No. 1677642, and proposes an ink which contains a dye and a quaternary phosphonium ion in the ink in Japanese Patent No. 2085163. These are technologies which were proposed for clogging, cogation, preservation stability and the like. Accordingly, they are not those which were adequately studied about the prevention of the elution of a glass or silicon and silicon oxide being in contact with an ink, and further, about the prevention of the elution of a substrate in which an organic material and an inorganic material such as SiN, TiN, TiO or the like is provided on a glass or silicon and silicon oxide. In fact, even if these inks are used, the problem of the elution of glass or silicon and silicon oxide could not be solved.

SUMMARY OF THE INVENTION

It is an object of the invention to provide an ink which prevents the fluctuations of the size of ink drops and the discharge speed of the ink drops, and discharge inferiority, and is superior in the dispersibility of ink or the stability of dissolution, by preventing the elution of a glass, silicon and silicon oxide being in contact with the ink, as the ink for ink jet recording which is used for an ink jet printer in which at least a portion of a member being in contact with the ink is formed by any one of a glass, silicon and silicon oxide.

The present inventors have extensively studied, and as a result, have found that even if effects for clogging, cogation and the like may be occasionally observed, the elution of a glass or silicon and silicon oxide being in contact with an ink cannot be prevented by only reducing the content of specific elements such as sodium, potassium and the like, but it can be realized by adding a corrosion inhibitor such as a phosphonium ion or the like which is indicated by the general formula (Formula 1).

Similarly, the present inventors have found that it can be realized by managing the total of the content of alkali metals in an ink.

To achieve the above objects, a first aspect of the present invention provides an ink for ink jet recording used for an ink jet printer in which at least a portion of a member being in contact with the ink is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, wherein a corrosion inhibitor is contained, and a phosphonium ion represented by the general formula (Formula 1) described below is contained:

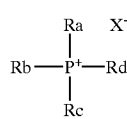

[Formula 1]

(wherein in Formula 1, Ra, Rb, Rc and Rd represent a linear, branched, or cyclic alkyl group having 1 to 4 carbon atoms, a hydroxyalkyl group, a halogenated alkyl group and a substituted or non substituted phenyl group, and X$^-$ represents a counter ion).

A second aspect of the present invention provides an ink for ink jet recording according to the first aspect, wherein the counter ion is a hydroxyl ion.

A third aspect of the present invention provides an ink for ink jet recording used for an ink jet printer in which at least a portion of a member being in contact with the ink is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, wherein an acetylene compound represented by the general formula (Formula 2) described below is contained:

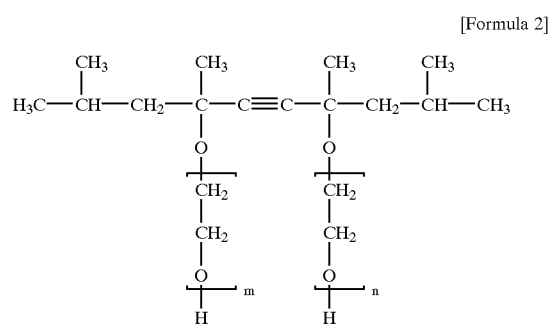

[Formula 2]

(wherein in the formula, m and n represent an integer of 0 to 20).

A fourth aspect of the present invention provides an ink for ink jet recording used for an ink jet printer in which at least a portion of a member being in contact with the ink is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, wherein a cationic compound is contained.

A fifth aspect of the present invention provides an ink for ink jet recording according to the fourth aspect, wherein the cationic compound is a cationic resin and a cationic surfactant.

A sixth aspect of the present invention provides an ink for ink jet recording used for an ink jet printer in which at least a portion of a member being in contact with the ink is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, wherein a cationic coloring material is contained.

A seventh aspect of the present invention provides an ink for ink jet recording according to the sixth aspect, wherein the cationic coloring material is a cationic dye, a cationic carbon black and a cationic pigment.

An eighth aspect of the present invention provides an ink for ink jet recording used for an ink jet printer in which at least a portion of a member being in contact with the ink is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, wherein a coloring material that is an inclusion compound included by a resin or a colored resin fine particle colored with a coloring material is contained.

A ninth aspect of the present invention provides an ink for ink jet recording according to the eighth, wherein the coloring material is a dye and/or a pigment.

A tenth aspect of the present invention provides an ink for ink jet recording used for an ink jet printer in which at least a portion of a member being in contact with the ink is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, wherein the total of the content of alkali metals in the ink is 700 ppm or less, and 30% or more of a phosphonium ion represented by the above-mentioned general formula (Formula 1) based on the equivalent of an anionic compound which is contained in the ink is contained.

An eleventh aspect of the present invention provides an ink for ink jet recording used for an ink jet printer in which at least a portion of a member being in contact with the ink is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, wherein the total of the content of alkali metals in the ink is 700 ppm or less, and 30% or more of an acetylene compound represented by the above-mentioned general formula (Formula 2) based on the equivalent of an anionic compound which is contained in the ink is contained.

A twelfth aspect of the present invention provides an ink for ink jet recording used for an ink jet printer in which at least a portion of a member being in contact with the ink is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, wherein the total of the content of alkali metals in the ink is 700 ppm or less, and 30% or more of a cationic compound based on the equivalent of an anionic compound which is contained in the ink is contained.

A thirteenth aspect of the present invention provides an ink for ink jet recording used for an ink jet printer in which at least a portion of a member being in contact with the ink is formed by anyone of a borosilicate glass, a soda lime glass, a photosensitive glass, single crystal silicon, polysilicon, a silicon oxide film, a titanium nitride film, a zirconium film, a titanium oxide film, and a silicon nitride film, wherein the total of the content of alkali metals in the ink is 700 ppm or less, and 30% or more of a cationic coloring material based on the equivalent of an anionic compound which is contained in the ink is contained.

A fourteenth aspect of the present invention provides an ink for ink jet recording according to any one of the first to thirteenth aspects, wherein pH of the ink is within a range of 7 to 10.

A fifteenth aspect of the present invention provides an ink for ink jet recording used for an ink jet printer in which at least a portion of a member being in contact with the ink is formed by a glass, wherein the total of the content of alkali metals in the ink is 700 ppm or less.

A sixteenth aspect of the present invention provides an ink for ink jet recording according to the fifteenth aspect, used for an ink jet printer in which at least a portion of a member being in contact with the ink is further formed by silicon or silicon oxide.

A seventeenth aspect of the present invention provides an ink for ink jet recording according to the fifteenth or sixteenth aspect, wherein 30% or more of a quaternary ammonium ion and an alkanolamino ion which are indicated by the formula A described below, based on the equivalent of an anionic compound which is contained in the ink is contained:

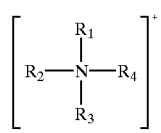

[Formula A]

(wherein in the formula A, R1 to R4 represent a hydrogen atom, an alkyl group having 1 to 4 carbon atoms, a hydroxyalkyl group, and a halogenated alkyl group).

An eighteenth aspect of the present invention provides an ink for ink jet recording according to the seventeenth aspect, wherein at least a portion of the quaternary ammonium ion and an alkanolamino ion which are indicated by the formula A is corrin indicated by the formula B described below:

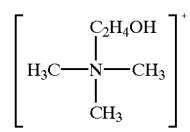

[Formula B]

A nineteenth aspect of the present invention provides an ink for ink jet recording according to the seventeenth or eighteenth aspect, wherein at least a portion of the quaternary ammonium ion and an alkanolamino ion which are indicated by the formula A is triethanol amine indicated by the formula C described below:

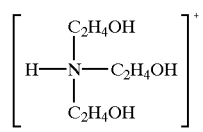

[Formula C]

A twentieth aspect of the present invention provides an ink for ink jet recording according to any one of the seventeenth to nineteenth aspects, wherein at least a portion of the quaternary ammonium ion and an alkanolamino ion which are indicated by the formula A is tetramethylammomium indicated by the formula D described below:

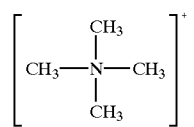

[Formula D]

A twenty-first aspect of the present invention provides an ink for ink jet recording according to any one of the seventeenth to twentieth aspects, wherein at least a portion of the quaternary ammonium ion and an alkanolamino ion which are indicated by the formula A is an ammomium ion indicated by the formula E described below:

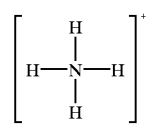

[Formula E]

A twenty-second aspect of the present invention provides an ink for ink jet recording according to any one of the first to twenty-first aspects, used for an ink jet printer in which at least a portion of a liquid chamber member is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film.

A twenty-third aspect of the present invention provides an ink for ink jet recording according to any one of the first to twenty-first aspects, used for an ink jet printer in which at least a portion of the member of a fluid resistance part is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film.

A twenty-fourth aspect of the present invention provides an ink for ink jet recording according to any one of the first to twenty-first aspects, used for an ink jet printer in which at least a portion of the member of a vibration plate is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film.

A twenty-fifth aspect of the present invention provides an ink for ink jet recording according to any one of the first to twenty-first aspects, used for an ink jet printer in which at least a portion of the member of a nozzle is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film.

A twetny-sixth aspect of the present invention provides an ink jet recording method carrying out recording using an ink jet printer in which at least a portion of a liquid chamber member is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, and the ink for ink jet recording according to any one of the first to twenty-fifth aspects.

A twenty-seventh aspect of the present invention provides an ink jet recording method carrying out recording using an ink jet printer in which at least a portion of the member of a fluid resistance part is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, and the ink for ink jet recording according to any one of the first to the twenty-fifth aspects.

A twenty-eighth aspect of the present invention provides an ink jet recording method carrying out recording using an ink jet printer in which at least a portion of the member of a vibration plate is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, and the ink for ink jet recording according to any one of the first to twenty-fifth aspects.

A twenty-ninth aspect of the present invention provides an ink jet recording method carrying out recording using an ink jet printer in which at least a portion of the member of a nozzle is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, and the ink for ink jet recording according to any one of the first to twenty-fifth aspects.

A thirtieth aspect of the present invention provides an ink jet recording method according to any one of the twenty-sixth to twenty-ninth aspects, using an ink jet printer in which a groove is formed by treating the liquid chamber member, the fluid resistance part, the vibration plate or the nozzle by an etching treatment, a sandblast treatment, an excimer laser processing or drilling.

A thirty-first aspect of the present invention provides an ink jet recording method using an ink jet printer in which at least a portion of a member being in contact with the ink is formed by a glass, and the ink for ink jet recording in which the total of the content of alkali metals in the ink is 700 ppm or less.

A thirty-second aspect of the present invention provides an ink jet recording method according to the thirty-first aspect, using an ink jet printer in which at least a portion of a member being in contact with the ink is further formed by silicon or silicon oxide.

A thirty-third aspect of the present invention provides an ink jet recording method according to the thirty-first or thirty-second aspect, wherein 30% or more of a quaternary ammonium ion and an alkanolamino ion which are indicated by the formula A based on the equivalent of an anionic compound which is contained in the ink is contained.

A thirty-fourth aspect of the present invention provides an ink jet recording method according to the thirty-third aspect, wherein at least a portion of the quaternary ammonium ion and an alkanolamino ion which are indicated by the formula A is corrin indicated by the formula B.

A thirty-fifth aspect of the present invention provides an ink jet recording method according to the thirty-third or thirty-fourth aspect, wherein at least a portion of the quaternary ammonium ion and an alkanolamino ion which are indicated by the formula A is triethanol amine indicated by the formula C.

A thirty-sixth aspect of the present invention provides an ink jet recording method according to any one of the thirty-third to thirty-fifth aspects, wherein at least a portion of the quaternary ammonium ion and an alkanolamino ion which are indicated by the formula A is tetramethyl ammonium indicated by the formula D.

A thirty-seventh aspect of the present invention provides an ink jet recording method according to any one of the thirty-third to thirty-fifth aspects, wherein at least a portion of the quaternary ammonium ion and an alkanolamino ion which are indicated by the formula A is an ammomium ion indicated by the formula E.

A thirty-eighth aspect of the present invention provides an ink jet recording method according to any one of the thirty-first to thirty-seventh aspects, using an ink jet printer in which the liquid chamber member composed of a glass or single crystal silicon.

A thirty-eighth aspect of the present invention provides an ink jet recording method according to any one of the thirty-first to thirty-eighth aspects, using an ink jet printer in which the fluid resistance is composed of a glass or single crystal silicon.

A fortieth aspect of the present invention provides an ink jet recording method according to any one of the thirty-first to thirty-ninth aspects, using an ink jet printer in which the vibration plate is composed of a glass or single crystal silicon.

A forty-first aspect of the present invention provides an ink jet recording method according to any one of the thirty-first to fortieth aspects, using an ink jet printer in which the nozzle is composed of a glass or single crystal silicon.

A forty-second aspect of the present invention provides a recording liquid cartridge equipped with a recording liquid storing part which stored a recording liquid, wherein the recording liquid is a recording liquid according to anyone of the first to twenty-fifth aspects.

A forty-third aspect of the present invention provides a recording liquid cartridge equipped with a recording liquid storing part which stores a recording liquid, and a head part for discharging the drops of recording liquid, wherein the recording liquid is a recording liquid according to any one of the first to twenty-fifth aspects.

A forty-fourth aspect of the present invention provides an inkjet recording apparatus equipped with a recording liquid cartridge having a recording liquid storing part which stored a recording liquid, and a head part for discharging the drops of recording liquid, wherein the recording liquid is a recording liquid according to any one of the first to twenty-fifth aspects.

Other objects and features of this invention will become apparent from the following description with reference to the accompanying drawings.

DETAILED DESCRIPTION OF THE PREFERRED EMBODIMENTS

Figure 1:
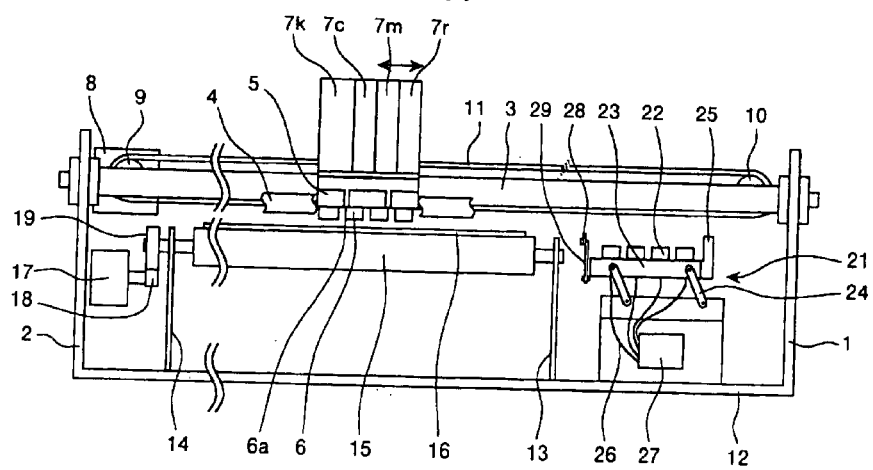
FIG. 1 is a schematic frontal view of showing the configuration example of a serial type ink jet recording apparatus which mounts an ink cartridge which stores the recording liquid of the present invention.

The present invention is illustrated in detail below.

The present inventors obtained a conception that the total of the content of all alkali metals which are contained in an ink is about 800 ppm from a measurement result of ICP, but since 0.05% to 5.0%, preferably 0.1% to 2.0% and more preferably 0.2% to 0.8% of a corrosion inhibitor is contained, the elution of a glass or silicon and silicon oxide being in contact with an ink can be prevented. The corrosion inhibitor mentioned here means a phosphonium ion, an olefin-based compound, a cationic resin, a cationic surfactant, a cationic coloring agent and the like.

Further, the alkali metal mentioned here is a metal of Group I of the Periodic Table, and specificarylithium, sodium, potassium rubidium, cesium and francium. Further, in the actual ink, amount of sodium is the greatest. Further, francium exists at an amount of several hundred grams in 20 km of the earth crust on the Earth by calculation, exists very rarely on the Earth, therefore its amount may be considered to be nearly zero gram. Accordingly, the total content of alkali metals can be regulated without considering the amount of francium.

As the glass used in the present invention, any usual glass may be used. A borosilicate glass, a quartz glass, a low alkali glass, a non-alkali glass and a soft glass (blue glass) are preferably mentioned. When it is used for a head which is composed of the glass in combination with other material, it is preferable to use glasses having an approximate linear expansion coefficient, and for example, in case of a head constituted with silicon, Pyrex glass # 7740, Corning Coat 7913, Corning Coat 7052, Corning Coat 7056 and the like are mentioned. As the glass being most preferable for anode conjunction, non alkali glass substrates OA-2 and OA-10, a low alkali glass substrate BLC (Nippon Electric Glass Co., Ltd.), blue glasses (soft glass) SL and NA (HOYA), and the like are mentioned. These glasses can be connected with silicon.

Further, a photosensitive glass can be also used. The photosensitive glass in which anisotropic etching can be carried out is more preferable. Specifically, photosensitive glass manufactured by HOYA Co., Ltd. and Nippon Electric Glass Co., Ltd. in which anisotropic etching can be carried out can be used.

Since the alkali metal in an ink invades into a glass, or further silicon, silicon oxide and the like which are in contact with the ink to be dispersed, it is considered that it has an action of continuously eluting the glass, silicon and the like. The elution of silicon and silicon oxide can be also suppressed by setting the total content of alkali metals in the ink as 700 ppm or less, preferably 150 ppm or less, and further preferably 50 ppm or less. The elution can be also suppressed to a level which may be out of consideration by containing the corrosion inhibitors such as a phosphonium ion represented by the general formula (Formula 1) a phosphonium ion represented by the general formula (Formula 1) and the like, without reducing the content of alkali metals. As its reason, the corrosion inhibitors are adsorbed on silicon, silicon oxide and the like which are in contact with the ink, to be remained, the glass and silicon are not continuously eluted, and it is considered that they have an action of preventing the elution of the glass and silicon even if the content of alkali metals is much. This can be confirmed by the difference of zeta electric potential in comparison with no addition of the corrosion inhibitors, examining an electric double layer when they were added, and it can be confirmed that they are adsorbed on the surfaces of the glass and silicon to be remained.

Further, since 30% or more of a quaternary ammonium ion and an alkanolamino ion which are indicated by the formula A of the 50% or more, based on the equivalent of an anionic compound which is in contact with the ink is contained, the elution of the glass and silicon being in contact with can be further suppressed. Since the quaternary ammonium ion and the alkanolamino ion which are indicated by the formula A are adsorbed on the surface of the glass, silicon, and silicon oxide being in contact with the ink to be remained, the continuous elution in the glass, silicon, and silicon oxide is not carried out, and it is considered that they have an action of preventing the elution.

Further, in the present invention, the ion is not always one kind of compound, and a mixture with other ions and compounds can be used. The ions include a sulfonium ion, an ammonium ion, a phosphonium ion, an arsonium ion and the like. The compounds include a cationic resin, a boron compound, an olefin-based compound and the like. Among the phosphonium ion represented by the general formula (Formula 1), the compounds indicated the under-mentioned formulae (Chemical Formula 1), (Chemical Formula 2), (Chemical Formula 3) and (Chemical Formula 4) have a high prevention effect of the elution of the glass, silicon, and silicon oxide in particular, are superior in the dispesribility and dissolution stability of the coloring agent, and other qualities required for the ink for ink jet recording are satisfied, therefore they are further preferable.

[Chemical Formula 1]

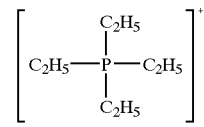

[Chemical Formula 2]

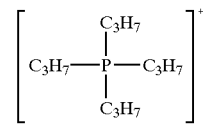

[Chemical Formula 3]

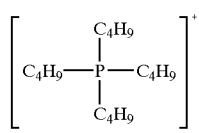

[Chemical Formula 4]

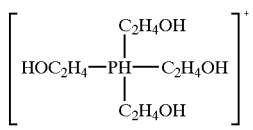

As the phosphonium ion represented by the general formula (Formula 1) other than the compounds indicated the above-mentioned formulae (Chemical Formula 1), (Chemical formula 2), (Chemical Formula 3) and (Chemical Formula 4), specifically, the compounds indicated the undermentioned formulae (Chemical Formula 5) to (Chemical Formula 26) can be mentioned.

[Chemical Formula 5]

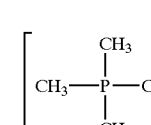

[Chemical Formula 6]

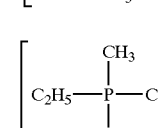

[Chemical Formula 7]

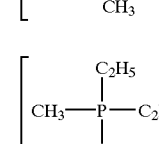

[Chemical Formula 8]

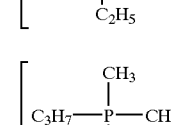

[Chemical Formula 9]

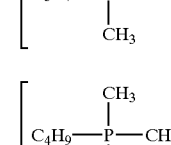

[Chemical Formula 10]

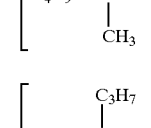

[Chemical Formula 11]

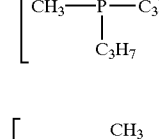

[Chemical Formula 12]

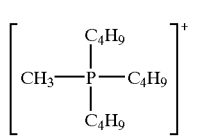

[Chemical Formula 13]

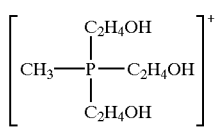

[Chemical Formula 14]

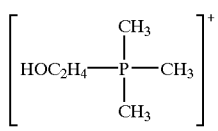

[Chemical Formula 15]

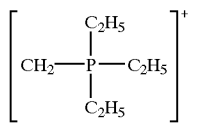

[Chemical Formula 16]

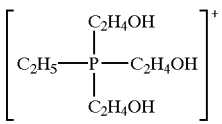

[Chemical Formula 17]

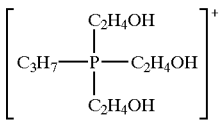

[Chemical Formula 18]

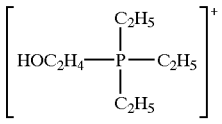

[Chemical Formula 19]

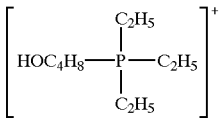

[Chemical Formula 20]

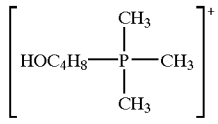

[Chemical Formula 21]

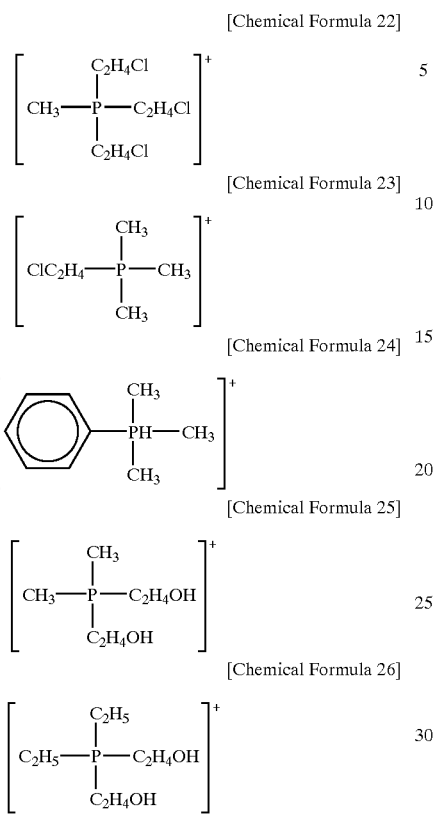

Further, in the present invention, it is unnecessary that all of the ions are the compound of the above-mentioned formula A, and can be mixed with other ions.

Among the quaternary ammonium ion and the alkanolamino ion which are indicated by the formula A, corrin indicated by the formula B, triethanol amine indicated by the formula C, tetramethylammonium indicated by the formula D and ammonium ion indicated by the formula E have particularly high prevention effect of the elution of silicon and silicon oxide, are superior in the dispersibility and dissolution stability of the coloring agent, and other qualities required for the ink for ink jet recording are satisfied, therefore they are further preferable.

As the quaternary ammonium ion and the alkanolamino ion which are indicated by the formula A other than corrin, triethanol amine, tetramethylammonium and ammonium ion, those shown below can be mentioned.

[Formula 35]

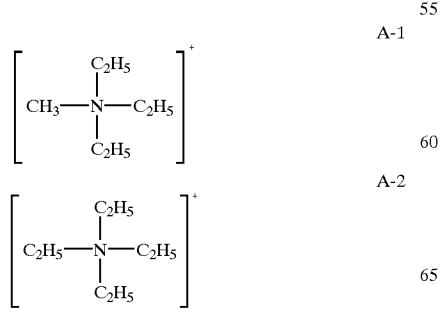

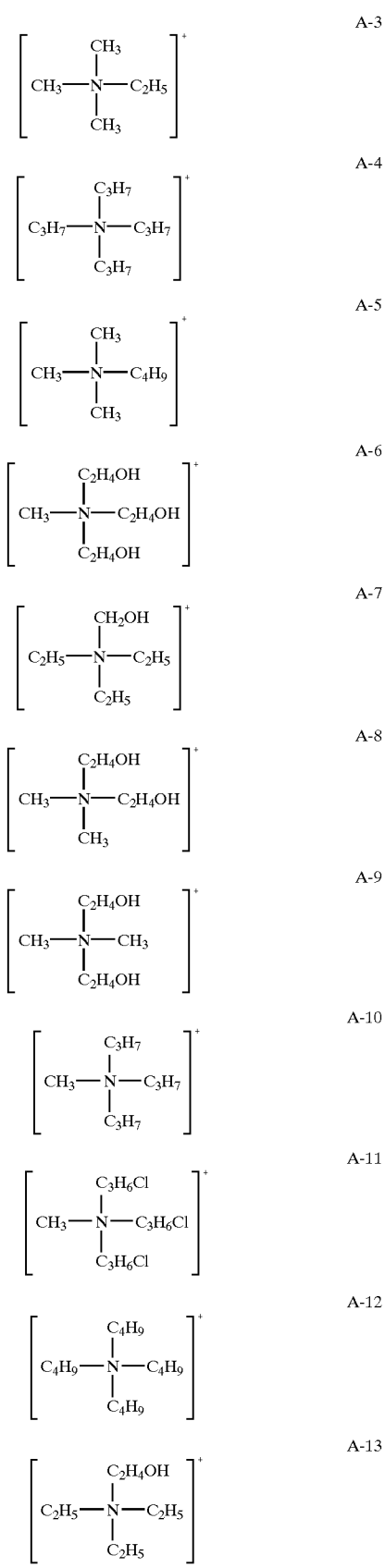

-continued

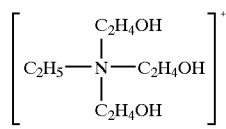

A-14

It is needless to say that they are not limited to these. Among these, one kind or a plurality of kinds can be added if they are within a range of satisfying other quality which is required for the ink for ink jet recording and having no side reaction such as toxicity or the like. Among these, carbon numbers of 4 to 12 in a molecular ion is preferable. When the carbon numbers is greater than 12, the solubility in a solvent such as water or the like is lowered, and there tend to occur side effects that clogging occurs during the stop of printing and during continuous printing, and the separation of an ink and the occurrence of precipitation tend to occur.

The present invention can prevent corrosion even if the content of alkali metals is much as described above, and further, the present invention prescribes the content of alkali metals as described above. However, when the anionic compounds such as a coloring agent, a penetrant, a dispersant, a surfactant and the like are obtained by the form of alkali metal salts such as a sodium salt, a potassium salt and the like, the content of alkali metals occasionally exceeds the prescribed amount of 800 ppm when they are used according to an addition amount as they are. In this case, at least a portion of the counter ion of alkali metals is replaced with ions other than alkali metal salts, and thus the content of alkali metals may be reduced.

As the method, a method by an ion exchange resin, and a method of a salt precipitation method of adding a desired ion, preferably a salt containing an onium ion which is indicated by the general formula (Formula 1) and the general formula (Formula 2) to a solution of alkali metals such ac sodium and the like, or adding a salt which contains the quaternary ammonium ion and the alkanolamino ion which are indicated by the formula A to precipitate, are mentioned as a method of directly exchanging ions. As a method of converting a salt of alkali metals such as sodium and the like to a free acid once, a method of adding a strong acid to the anionic compound or its solution and separating it by solvent extraction, residue, filtration and the like is mentioned in addition to the method of treating with the ion exchange resin.

When the anionic compound is obtained in a form other than alkali metals, it may be used as it is. Further, at least a portion of ions may be used in place of the phosphonium ion indicated by the general formula (Formula 1), or in place of the quaternary ammonium ion and the alkanolamino ion which are indicated by the formula A.

When the anionic compound is obtained in a form of a free acid, the ink of the present invention can be also obtained by adding an ion other than alkali metals, preferably the phosphonium ion indicated by the general formula (Formula 1) in place of at least a portion of the anionic compound of a free acid or its solution, or an ion other than alkali metals, preferably the quaternary ammonium ion and the alkanolamino ion which are indicated by the formula A in place of at least a portion of the anionic compound of a free acid or its solution.

Specifically, there is a method described below for adding the phosphonium ion to the ink composition.

(i) Method of Adding as pH Adjusting Agent

The phosphonium ion can be added to the ink composition by adding phosphonium hydroxide, phosphonium carbonate and the like as a pH adjusting agent. Namely, phosphonium hydroxide, phosphonium carbonate and the like have about the same acid-base dissociation constant as sodium hydroxide, sodium carbonate and the like, and the addition can be carried out using phosphonium in similar manner as that pH of an ink was conventionally adjusted using sodium hydroxide, sodium carbonate and the like.

(ii) Method of Adding as Counter Ion of Dye

There is the following method as a method of adding as the counter ion of a dye which has an acidic group such as $-SO_3H$, $-COOH$, $-OH$ or the like.

(a) Acid Precipitation Method

The method can be used when a dye is precipitated when the pH value of its solution is lowered.

A dye [DM] which is a salt of a cation (generally, $Na^+$) other than phosphonium is dissolved in a solvent, an acid such as hydrochloric acid, sulfuric acid, acetic acid, nitric acid or the like is added thereto, and the dye which is a form of a free acid is precipitated.

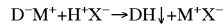

(D ... dye ion, M ... cation such as Na, $NH_4$, K or the like, X ... $Cl^-$, $NO^{3-}$, $SO^{2-}_4$, $CH_3COO^-$ and the like)

A precipitate is filtrated and washed, and $M^+X^-$ as impurities is removed. The dye thus obtained is dissolved by phosphonium hydroxide to be used for an ink.

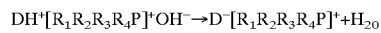

(b) Salt Precipitation Method

A dye is dissolved in a water-ethanol mixed solvent, a water-methanol mixed solvent or a water-acetone mixed solvent, a phosphonium salt such as phosphonium chloride, phosphonium acetate, phosphonium sulfate or the like, and the dye is precipitated as a phosphonium salt.

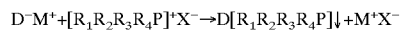

The precipitate obtained is filtrated, washed with the solvent, and $M^+X^-$ is removed. The dye can be used as an ink as it is.

(c) Ion Exchange Method

A resin or a membrane which has the capability of ion exchange is used, a dye solution is directly converted to a phosphonium salt by being passed through the resin or the membrane, and after converting once to the form of a free acid in like manner as in the acid precipitation method, the phosphonium salt of the dye is obtained by phosphonium hydroxide.

A) The ion of an ion exchange group is converted to a phosphonium type, and passed through the dye solution.

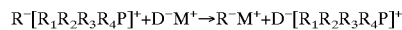

($R^-$ is the ion exchange group of an ion exchange resin or a membrane)

B) The ion exchange group is converted to a H type and passed through the dye solution. In this case, it is suitable for the ion exchange of an acidic dye which has the high solubility of a free acid type dye, in particular.

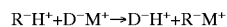

(d) Method of Adding Phosphonium Salt at Synthesis Step

A phosphonium salt is used for a material at synthesizing a dye. For example, when an acidic compound in a raw material is dissolved and added, it is conventionally dissolved using sodium hydroxide, but it is a method of dissolving using a phosphonium salt at this time. $[R_1R_2R_3R_4P]^+NO_2$ is used in place of $NaNO_2$ which is used for diazotization. NaOH and $Na_2CO_3$ have been conventionally added in the reaction solution in order to carry out alkali coupling, but a method of adding a phosphonium salt in place of this and the like are mentioned.

(e) Extraction Method

It is a method of utilizing to an ink $D^-[R_1R_2R_3R_4P]^+$ obtained by utilizing the solubility difference of $D^-M^+$ and $D^-[R_1R_2R_3R_4P]^+$ or $D^-H^+$ to a specific solvent. For example, obtained is a method that after a dye of $D^-M^+$ is dissolved, a phosphonium salt is added, the solvent in the solution is evaporated to be dried, a mixture of the phosphonium salt of the dye and an $M^+$ salt was obtained, then Soxhlet extraction is carried out, and the phosphonium salt of the dye having high solubility in methanol is obtained.

(iii) Method of Adding as Counter Ion of Additive to Ink Other than Dye

Electroconductive adjusting agent . . . NaCl, LiCl, $Na_2SO_4$, and $NaNO_3$ and the like have been conventionally used, but the phosphonium salt can be used in place of these.

Preservative . . . sodium dehydroacetate, sodium benzoate, sodium salt of 2-pyridynethiol oxide, sodium salt of 1,2-benzi-isothiazaline-3-one and the like are used, but the phosphonium salt is used in place of these sodium salts.

Surfactant . . . The phosphonium salt is used in place of the sodium of an anion surfactant such as sodium dodecyl-benzenesulfonate or the like.

Chelating agent . . . The phosphonium salt is used in place of the trisodium salt of EDTA.

It is most preferable to add as phosphonium hydroxide or phosphonium carbonate as an adjusting agent of pH value, or add as the counter ion of a dye including an acidic group such as a sulfonic acid, a carboxylic acid or the like, in order to add the phosphonium salt to the ink composition. Even if it is used as a pH value adjusting agent, or even if it is used as the counter ion of the raw material of an ink of other dye or the like, almost all of the phosphonium ions are dissociated to exist as $[R_1R_2R_3R_4P]^+$, and the cation in the ink usually exist most as the counter ion of an ink from the point of quantity.

The lesser the ions such as $Na^+$, $K^+$, $NH_4^+$, and the like other than the phosphonium which is contained in the ink are, the larger the effect of the present invention is, therefore it is preferable to use the counter ion (cation) of an ink in place of the phosphonium by any one of the above-mentioned methods or other methods, according to the object.

Thus, when the anionic compound can be obtained in the form of a free acid, it is unnecessary to convert a free acid type compound to a salt other than alkali metals at preparation of the ink. The anionic compound having the above-mentioned counter cation is contained in the ink, by adding 30% or more and more preferably 50% or more of a phosphonium ion represented by the general formula (Formula 1) based on the equivalent of an anionic compound and adjusting the pH value of the ink at 6.0 or more, or by adding in a free acid type anionic compound 30% or more and more preferably 50% or more of a quaternary ammonium ion and an alkanolamino ion which are indicated by the formula A, based on the equivalent of an ion other than alkali metals, preferably the free acid type anionic compound in the ink and adjusting the pH value of the ink at 6.0 or more. Accordingly, the work required for production of the ink becomes simple in particular, and further, it is preferable to be able to very easily prevent the elution of a glass, silicon, silicon oxide and the like.

When the counter ion is the phosphonium ion represented by the general formula (Formula 1), it is preferable that carbon number in a molecule is 4 to 12. Alternatively, when the counter ion is the quaternary ammonium ion and an alkanolamino ion which are indicated by the formula A, it is preferable that it has a substituted or non-substituted alkyl group and the carbon number in a molecule is 4 to 12. When the carbon number is bigger than 12, the solubility to a solvent such as water or the like is lowered, and there tend to occur side effects that clogging occurs during the stop of printing and during continuous printing, and the separation of an ink and the occurrence of precipitation tend to occur.

Counter ion of onium salt: $X^-$ may be arbitrarily a halogen ion; an inorganic anion such as a nitric acid ion, a nitrous acid ion, an acetic acid ion, a phosphoric acid ion, a sulfuric acid ion or the like; an organic anion and the like which were derived from an organic acid such as formic acid, acetic acid, propionic acid, butyric acid, valeric acid, glycolic acid, gluconic acid, a lactic acid, and the like. Among these, it is preferable that it is ionically dissociated in the ink at a high rate. Accordingly, a mono-valent ion selected from a halogen ion, a nitric acid ion, a nitrous acid ion and an acetic acid ion is preferable, and a hydroxyl ion is preferable in particular.

In addition to the phosphonium ion, the similar effect is observed by adding about 1% of a usual cationic resin such as a polyarylamine, a polyethyleneimine or the like. Further, OLFIN B and P, SURFYNOL 61 and the like of an acetylene surfactant which has a cylindrical electronic cloud ($\pi$-electron) of a triple bond and an active hydrogen atom of an adjacent OH group prepare orientation and complex formation on the surface of a glass and silicon easily, and reveal the similar effect as the phosphonium ion. Further, a cationic dye, a cationic carbon black and a cationic pigment orient on the surface of a glass and silicon, and reveal the similar effect as the phosphonium ion.

Specific kinds of the cationic compound include a dicyandiamide-formalin polycondensate, a dicyandiamide-diethylenetriamine polycondensate, an epichlorhydrin-dimethylamine addition polymer, a dimethyl diaryl ammonium chloride-SO copolymer, a dimethyl diaryl ammonium chloride polymer, an arylamine salt polymer, a dialkylami-noethyl (meth)acrylate quaternary salt polymer, a polyarylamine, a cation epoxy resin, a polyethyleneimine, a polyacrylamide, a poly(meth)acrylate, a polyvinyl formamide, an aminoacetalized polyvinyl alcohol, a polyvinyl pyridine, a polyvinylbenzylphosphonium, a cation emulsion and the like.

A commercially available resin can be used as these cationic resins. Specifically, SUNSTATT E-818, SANFIX 70, SANFIX 555C, SANFIX LC-55, SANFIX PAC-700CONC, SANYOELLION A-3, SANFIX 414, SANFIX555, SANFIXPRO-100, SANFIX555US, CELLOPOLYM-500 (theabove were manufactured by Sanyo Chemicals Co., Ltd.), #675, #FR-2P, #1001 (the above were manufactured by Sumitomo Chemical Industry Co., Ltd.), LUPASOL SC61B (manufactured by BASF Co., Ltd.) and the like. Further, ZP-700 (vinyl formamide-based), MP-184 (polyacrylate-based), MP-173H (polymethacrylate-based), MP-180 (polymethacrylate-based), MX-0210 (polymethacrylate-based), MX-813 (polyacrylate-based), E-395 (polyacrylate-based), E-305 (polyacrylate-based), Q-105H (dicyandiamide-based), Neo-600 (polyacryl amide) (the above were manufactured by HYMO CORPORATION), SUPERFLOC 2400 (polyacrylate-based), SUPERFLOC 3180, 3380, 3580, 3880, 3390, 3590, 3500 and SD2081 (polyacryl amide), ACOFLOC C498T and C498Y (polyacrylate-based), SUPERFLOC 1500 and 1600, ACOFLOC C481, C483, C485, C488 and C480 (polymethacrylate-based) (the above were manufactured by Mitsui Sci-Tech), PAS-A-1, PAS-A-5, PAS-A-120L, PAS-A-120S, PSA-J-81, PAS-880, PAS-92 (diaryldimethylammonium salt-based polymer), PAS-H-5L, PAS-H-10L, PAS-M-1 (diaryldimethylammonium salt-based polymer) (the above were manufactured by Nitto Boseki Co., Ltd.), PAA-HC1-3L, PAA-HC1-10L (polyarylamine hydrogen chloride salt), PAA-10C (polyarylamine) (the above were manufactured by Nitto Boseki Co., Ltd.), Q-101 (polyamine-based), Q-311 (polyamine-based), Q-501 (polyamine-based) (the above were manufactured by HYMO Co., Ltd.), ACOFLOC C5677, C573, C577 and C581 (polyamine-based) (the above were manufactured by Mitsui Sci-Tech), and the like are mentioned.

Further, as the cationic emulsion, ACRIT UW319-SX, ACRIT RKW-460, ACRIT RKW-400SX, ACRIT RKW-450SX, ACRIT RKW-450 (the above were manufactured by Taisei Chemical Industries, Ltd.) and the like are mentioned. These cationic resins can be used alone and a mixture of two or more may be used.

Further, as the specific kind of the acetylene compound, SURFYNOL 104E, SURFYNOL 104H, SURFYNOL 104A, SURFYNOL 104BC, SURFYNOL 104PA, SURFYNOL 104S, SURFYNOL 420, SURFYNOL 440, SURFYNOL 465, SURFYNOL 485, SURFYNOL SE, SURFYNOL SE-F, SURFYNOL 504, SURFYNOL DF110D, SURFYNOL DF110L, SURFYNOL DF37, SURFYNOL DF58, SURFYNOL DF75, SURFYNOL DF210, SURFYNOL CT111, SURFYNOL CT121, SURFYNOL CT131, SURFYNOL CT151, SURFYNOL TG, SURFYNOL GA, SURFYNOL 61, OLFIN B, OLFIN F, OLFIN P, OLFIN Y, OLFIN A, OLFIN STG, OLFIN SPC, OLFIN E1004, OLFIN E1010, OLFIN AK-02 and the like which are manufactured by Nissin Chemical Industry Co., Ltd. are mentioned.

Further, when the coloring material that is an inclusion compound included by a resin or a colored resin fine particle which was colored by the coloring material, the elution of a glass and silicon can be reduced. The reason is considered that in case of impurities in the coloring material, particularly a carbon black, an acidic component which is contained in the carbon black dissolves the glass and silicon, and considered that the action of the component can be reduced by packing with a resin or forming a fine particle with the resin. Specifically, there are a micro-capsulated carbon black manufactured by Dainippon Ink and Chemicals, Inc., a micro-capsulated carbon black manufactured by Toyo Ink Mfg. Co., Ltd., a resin particle manufactured by Toyobo Co., Ltd., an emulsion ink of a dye and pigment manufactured by Kao Corporation and the like.

The pH of the ink in which these additives are added is preferably 7 to 10. When pH is within the range, a glass and silicon are not eluted. The lower the pH is, the preferable the elution of the glass and silicon is, and 7 to 9 is preferable and 7 to 8 is most preferable.

As the solvent of the ink recording liquid of the present invention, water is often used as a main component, but the water soluble organic solvent which was shown as a water soluble organic solvent which is used for the pretreatment liquid of the above-mentioned recorded material, according to the objects of obtaining a desired physical property of the ink, preventing the drying of the ink, and improving the dissolution stability of the ink and the like, can be used.

Namely, as the water soluble organic solvent, polyhydric alcohols such as ethylene glycol, diethylene glycol, triethylene glycol, polyethylene glycol, polypropylene glycol, 1,5-pentanediol, 1,6-hexanediol, glycerin, 1,2,6-hexanetriol, 1,2,4-butanetriol, 1,2,3-butanetriol, petriol and the like; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether and the like; polyhydric alcohol aryl ethers such as ethylene glycol monophenyl ether, ethylene glycol monobenzyl ether and the like; nitrogen-containing heterocyclic compounds such as N-methyl-2-pyrrolidone, N-hydoxyethyl-2-pyrrolidone, 2-pyrrolidone, 1,3-dimethylimidazolidinone, ε-caprolactam and the like; amides such as formamide, N-methylformamide, N,N-dimethylformamide, and the like; amines such as monoethanolamine, diethanolamine, triethanolamine, monoethylamine, diethylamine, triethylamine and the like; sulfur-containing compounds such as dimethylsulfoxide, sulfolane, thiodiethanol and the like; propylene carbonate, ethylene carbonate, γ-butyrolactone, and the like can be used. These solvents can be used alone together with water, or a mixture of a plurality of them can be used can be used.

Among these, diethylene glycol, thiodiethanol, polyethylene glycol 200 to 600, triethylene glycol, glycerin, 1,2,6-hexanetriol, 1,2,4-butanetriol, petriol, 1,5-pentanediol, N-methyl-2-pyrrolidone, N-hydoxyethyl-2-pyrrolidone, 2-pyrrolidone, and 1,3-dimethylimidazolidinone are preferably mentioned in particular. The effects of the prevention of the trouble of injection property by the clogging caused by drying, namely the evaporation of moisture and the improvement of the dissolution stability of the ink of the present invention can be obtained by using them. Further, superior effects for the high solubility of the compound of making the coloring material in the recording liquid insoluble and the prevention of the trouble of coating by the evaporation of moisture can be obtained.

As the coloring material used in the present invention, any of those which satisfy the content of alkali metals in the ink which is indicated in the present invention as it is or by reducing the alkali metals by the above-mentioned methods and the like, can be used in addition to the above-mentioned cationic coloring material. As the water soluble dye, dyes which are classified as an acidic dye, a substansive dye, a basic dye, a reactive dye, and a food color, in the color index, and preferably those which are superior in water resistance and light stability are used.

These dyes can be specifically mentioned below as the acidic dye and the food color;

C.I. Acid Yellow 17, 23, 42, 44, 79, 142
C.I. Acid Red 1, 8, 13, 14, 18, 26, 27, 35, 37, 42, 52, 82, 87, 89, 92, 97, 106, 111, 114, 115, 134, 186, 249, 254, 289
C.I. Acid Blue 9, 29, 45, 92, 249
C.I. Acid Black 1, 2, 7, 24, 26, 94
C.I. Food Yellow 3, 4
C.I. Food Red 7, 9, 14
C.I. Food Black 1, 2

As the direct dye, the dyes below can be mentioned:
C.I. Direct Yellow 1, 12, 24, 26, 33, 44, 50, 86, 120, 132, 142, 144
C.I. Direct Red 1, 4, 9, 13, 17, 20, 28, 31, 39, 80, 81, 83, 89, 225, 227
C.I. Direct Orange 26, 29, 62, 102
C.I. Direct Blue 1, 2, 6, 15, 22, 25, 71, 76, 79, 86, 87, 90, 98, 163, 165, 199, 202

C.I. Direct Black 19, 22, 32, 38, 51, 56, 71, 74, 75, 77, 154, 168, 171

As the basic dye, the dyes below can be mentioned:

C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91

C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112

C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155

C.I. Basic Black 2, 8

As the reactive dye, the dyes below can be mentioned:

C.I. Reactive Black 3, 4, 7, 11, 12, 17

C.I. Reactive Yellow 1, 5, 11, 13, 14, 20, 21, 22, 25, 40, 47, 51, 55, 65, 67

C.I. Reactive Red 1, 14, 17, 25, 26, 32, 37, 44, 46, 55, 60, 66, 74, 79, 96, 97

C.I. Reactive Blue 1, 2, 7, 14, 15, 23, 32, 35, 38, 41, 63, 80, 95

The acidic dye and the direct dye can be preferably used in particular.

Further, dyes which were newly developed for in jet can be also used. For example, Project Fast Black 2, Project Fast Magenta 2, Project Fast Yellow 2, and Project Fast cyan 2 (trade name) manufactured by Avecea Co., Ltd. are mentioned.

As pigments, as inorganic pigments, titanium oxide and iron oxide, calcium carbonate, barium sulfate, aluminum hydroxide, barium yellow, cadmium red, chromium yellow, and additionally carbon blacks which were produced by known methods such as a contact method, a furnace method, a thermal method and the like can be used. Further as organic pigments, azo pigments (including azo lake, insoluble azo pigment, condensed azo pigment, chelating azo pigment and the like), polycyclic pigments (for example, a phthalocyanine pigment, a perylene pigment, a perinone pigment, an anthraquinone pigment, a quinacridone pigment, a dioxazine pigment, an indigo pigment, a thioindigo pigment, an isoindolinone pigment, a quinofuralone pigment, and the like), a nitro pigment, a nitroso pigment, an aniline black and the like can be used. Among these pigments, pigments which has good affinity with a solvent are preferably used. The amount of the pigment added in the ink composition as the coloring agent is preferably 0.5 to 25% by weight and more preferably 2 to 15% by weight.

Specific examples of the pigment preferably used in the present invention include, as for black color, carbon blacks (C.I. Pigment Black 7) such as a furnace black, a lamp black, an acetylene black, a channel black and the like; metals such as copper, iron (C.I. Pigment Black 11), titanium oxide and the like; and organic pigments such as an aniline black (C.I. Pigment Black 1) and the like. Further, as for color, C.I. Pigment Yellow 1, there are 1, 3, 12, 13, 14, 17, 24, 34, 35, 37, 42 (yellow iron oxide), 5, 53, 55, 81, 83, 95, 97, 98, 100, 101, 104, 408, 109, 110, 117, 120, 138, 150, 153, C.I. Pigment Orange 5, 13, 16, 17, 36, 43, 51, C.I. Pigment Red 1, 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (red iron oxide) 104, 105, 106, 108 (cadmium red), 112, 114, 122 (quinacridone magenta), 123, 146, 149, 166, 168, 170, 172, 177, 178, 179, 185, 190, 193, 209, 219, C.I. Pigment Violet 1 (Rhodamine lake), 3, 5:1, 16, 19, 23, 38, C.I. Pigment Blue 1, 2, 15, (phthalocyanine blue), 15:1, 15:2, 15:3 (phthalocyanine blue), C.I. Pigment Green 1, 4, 7, 8, 10, 17, 18, 36 and the like.

Additionally, a graft pigment which was obtained by treating the surface of a pigment (for example, carbon) with a resin and making it dispersible in water, and a processed pigment which was obtained by adding functional groups such as a sulfone group, a carboxyl group and the like on the surface of a pigment (for example, carbon) and making it dispersible in water, and the like can be used. Further, those which were obtained by including a pigment in a micro capsule and making said pigment dispersible in water may be well.

According to the preferred embodiment of the present invention, the mean particle diameter of the pigment in the ink is preferably within a range of 50 nm to 200 nm. Wherein the mean particle diameter means a value of a volume cumulative percentage of 50%. In order to measure a value of a volume cumulative percentage of 50%, for example, a dynamic light scattering method (Doppler scattered light analysis) may be used. This is a method of irradiating laser beam to particles which carry out Brownian movement in an ink and determining the particle diameter from the variation amount of vibration number (frequency of light) of light (backscattering) which returns from the particles.

As the pigment dispersant, dispersants which satisfy the content of alkali metals in the ink indicated by the present invention by reducing the alkali metals as it is or by the above-mentioned method and the like, can be used.

The pigment is preferably added to the recording liquid as a pigment dispersed liquid which was obtained by dispersing it in an aqueous medium by a dispersant. As the preferable dispersant, known dispersant which is used for adjusting a conventionally known pigment dispersant can be used.

As the polymer dispersant, for example, dispersants below are mentioned.

As hydrophilic polymers, in natural polymers, vegetable polymers such as gum arabic, tragacanth gums, guar gum, karaya gum, locust bean gum, arabinogalactan, pectin, quince seed starch and the like; seaweed-based polymers such as alginic acid, kararginan, agar-agar and the like; animal-based polymers such as gelatin, casein, albumin, collagen and the like; micro-organism-based polymers such as xanthene gum, dextran and the like; in semi-synthetic polymers, cellulose-based polymers such as methyl cellulose, ethyl cellulose, hydroxyethyl cellulose, hydroxypropyl cellulose, carboxymethyl cellulose and the like; starch-based polymers such as sodium starch glycolate, sodium starch phosphate and the like; seaweed-based polymers such as sodium alginate, alginic acid propylene glycol ester and the like; in pure synthetic-based polymers, a polyacrylic acid, a polymethacrylic acid, an acrylic acid-acrylonitrile copolymer, a vinyl acetate-acrylate copolymer, an acrylic acid-alkyl acrylate copolymer, a styrene-acrylic acid copolymer, a styrene-methacrylic acid copolymer, a styrene-acrylic acid-alkyl acrylate copolymer, a styrene-methacrylic acid-alkyl acrylate copolymer, a styrene-α-methylstyrene-acrylic acid copolymer, a styrene-α-methylstyrene-acrylic acid-alkyl acrylate copolymer, a styrene-maleic acid copolymer, a vinyl naphthalene-maleic acid copolymer, a vinyl acetate-ethylene copolymer, a vinyl acetate-fatty acid vinyl ester-ethylene copolymer, a vinyl acetate-maleinate copolymer, a vinyl acetate-crotonate copolymer, a vinyl acetate-acrylic acid copolymer, and the like are mentioned. Further, in pure synthetic-based polymers, vinyl-based polymers such as a polyvinyl alcohol, a polyvinyl pyrrolidone, a polyvinyl methyl ether and the like; a non-crosslinking polyacryl amide, a polyacrylic acid and a alkali metal salt thereof, a alkali metal salt of acryl resins such as a water soluble acrylic resin and the like, a water soluble styrene-maleic acid resin, a water soluble vinyl naphthalene-acryl resin, a water soluble vinyl naphthalene-maleic acid resin, a polyvinyl pyrrolidone, a polyvinyl alcohol, β-naphthalene sulfonic acid-formalin condensate; polymers having a salt of a cationic functional group such as quaternary ammonium and an amino group or the like in a side chain; natural polymer compound such as shellac and the like, etc. are mentioned. The weight average molecular weight of these copolymers is preferably 3000 to 50000, more preferably 5000 to 30000, and most preferably 7000 to 15000. The amount of a polymer dispersant added may be appropriately added alone, or in a mixture of two or more, at a range in which it disperses pigments in stable and does not lose the other effect of the present invention. The ratio of the pigment to the dispersant is preferably a range of 1:0.06 to 1:3, and more preferably a range of 1:0.125 to 1:3.

Further, a water soluble surfactant can be also used as a pigment dispersant. In this case, the raise of ink viscosity against the use amount is less than a case of using a polymer dispersant, and the pigment ink having good discharge characteristic is easily obtained when it is used for an ink jet recording method.

Specific examples of the water soluble surfactant which is used as a pigment dispersant include, alkylaryl, an alkyl phosphate, an alkyl sulfate, an alkyl sulfonate, an alkyl ether sulfate, an alkyl sulfosuccinic acid salt, an alkylnaphthalene sulfate, an alkylester sulfate, an alkylbenzene sulfonate, an alkyldiphenyl ether disulfonate, an alkylaryl ether phosphate, an alkylaryl ether ester sulfate, an olefin sulfonate, an alkaneolefin sulfonate, a polyoxyethylene alkyl ether phosphate, a polyoxyethylene alkyl ether sulfuric acid ester salt, ether carboxylate, a sulfosuccinic acid salt, α-sulfofatty acid ester, a fatty acid salt, a polycondensate of a fatty acid and an amine, a naphthenic acid salt and the like, as anion surfactants.

As the cationic surfactant, there are an alkylamine salt, a dialkylamine salt, a fatty acid amine salt, a benzalkonium salt, a quaternary ammonium salt, an alkylpyridinium salt, an imidazolinium salt, a sulfonium salt, a phosphonium salt and the like.

As the nonionic surfactant, there are a polyoxyethylene alkyl ether, polyoxyethylene alkylaryl ether, a polyoxyethylene alkylphenyl ether, polyoxyethylene glycol ester, a polyoxyethylene fatty acid amide, a polyoxyethylene fatty acid ester, polyoxyethylene polyoxypropylene glycol, a glycerol ester, a sorbitan ester, a sucrose ester, polyoxyethylene ether of glycerol ester, polyoxyethylene ether of sorbitol ester, a fatty acid alkanol amide, an amine oxide, a polyoxyethylene alkyl amine, a glycerol fatty acid ester, a sorbitan fatty acid ester, a polyoxyethylene sorbitan fatty acid ester, a polyoxyethylene sorbitol fatty acid ester, an alkyl(poly)glycoxide and the like.

As the amphoteric surfactant, there are imidazoline derivatives such as imidazolinium betaine and the like, a dimethylalkyl lauryl betaine, an alkyl glycine, an alkyldi(aminoethyl) glycine and the like. The amount of the surfactant added as the dispersant may be appropriately added alone, or in a mixture of two or more, at a range in which it disperses pigments in stable and does not lose the other effect of the present invention.

Conventionally known additives can be added in the ink of the present invention in addition to the above-mentioned coloring agent and solvent. Additives which satisfy the content of alkali metals in the ink indicated by the present invention by reducing the alkali metals as they are or by the above-mentioned method and the like, can be used. For example, a penetrant can be added by the object of adjusting the surface tension of the ink. The penetrant includes polyhydric alcohols such as 2-ethyl-1,3-hexanediol, 2,2,4-trimethyl-1,3-pentanediol and the like; the alkyl and aryl ethers of a polyhydric alcohol such as diethylene glycol monophenyl ether, ethylene glycol monophenyl ether, ethylene glycol monoaryl ether, diethylene glycol monophenyl ether, diethylene glycol monobutyl ether, propylene glycol monobutyl ether, tetraethylene glycol chlorophenyl ether; a polyoxyethylene-polyoxypropylene block copolymer, a fluorine-based surfactant, lower alcohols such as ethanol, 2-propanol and the like.

Further, the surfactant can be added in the ink according to the objects of improving the penetration property to the recorded material by adjusting the surface tension of the recording liquid and improving the discharge stability of the ink and the like by improving the wettability of the recording liquid against the head member of an in jet printer.

Examples of the anion surfactant include alkylaryl, an alkyl phosphate, an alkyl sulfate, an alkyl sulfonate, an alkyl ether sulfate, an alkyl sulfosuccinic acid salt, an alkylnaphthalene sulfate, an alkylester sulfate, an alkylbenzene sulfonate, an alkyldiphenyl ether disulfonate, an alkylaryl ether phosphate, an alkylaryl ether ester sulfate, an olefin sulfonate, an alkaneolefin sulfonate, a polyoxyethylene alkyl ether phosphate, a polyoxyethylene alkyl ether sulfuric acid ester salt, ether carboxylate, a sulfosuccinic acid salt, α-sulfofatty acid ester, a fatty acid salt, a polycondensate of a fatty acid and an anine, a naphthenic acid salt and the like, as anion surfactants.

As the cationic surfactant, there are an alkylamine salt, a dialkylamine salt, a fatty acid amine salt, a benzalkonium salt, a quaternary ammonium salt, an alkylpyridinium salt, an imidazolinium salt, a sulfonium salt, a phosphonium salt and the like.

As the nonionic surfactant, there are a polyoxyethylene alkyl ether, polyoxyethylene alkylaryl ether, a polyoxyethylene alkylphenyl ether, polyoxyethylene glycol ester, a polyoxyethylene fatty acid amide, a polyoxyethylene fatty acid ester, polyoxyethylene polyoxypropylene glycol, glycerol ester, sorbitan ester, a sucrose ester, polyoxyethylene ether of glycerol ester, polyoxyethylene ether of sorbitol ester, a fatty acid alkanol amide, an amine oxide, a polyoxyethylene alkyl amine, a glycerol fatty acid ester, a sorbitan fatty acid ester, a polyoxyethylene sorbitan fatty acid ester, a polyoxyethylene sorbitol fatty acid ester, an alkyl(poly)glycoxide and the like.

As the amphoteric surfactant, there are imidazoline derivatives such as imidazolinium betaine and the like, a dimethylalkyl lauryl betaine, an alkyl glycine, an alkyldi(aminoethyl) glycine and the like.

Additionally, examples include anionic surfactants such as sodium dodecylbenzene sulfonate, sodium lauryl sulfate, an ammonium salt of a polyoxyethylene alkyl ether sulfate, a salt of a dialkylsulfosuccinic acid and the like; cationic surfactants such as a quaternary ammonium salt and the like; dual ion surfactants such as an imidazoline derivative and the like; nonionic surfactants such as a polyoxyethylene alkyl ether, polyoxyethylene alkylaryl ether, a polyoxyethylene alkylphenyl ether, a polyoxyethylene alkyl ester, a polyoxyethylene alkylamine, a polyoxyethylene alkyl amide, a polyoxyethylene-propylene block copolymer, a sorbitan fatty acid ester, a polyoxyethylene sorbitan fatty acid ester, an addition product of ethylene oxide with acetylene alcohol and the like; fluorine-based surfactants and the like.

The amount of these surfactants added in the ink composition is 0.01% by weight to 5.0% by weight and preferably 0.5% by weight to 3.0% by weight. When it is less than 0.01% by weight, an effect of addition is not observed. When the addition is more than 5.0% by weight, the penetration property to a recording medium becomes higher than requirement, and there occur problems that the concentration of an image is lowered and the strike through occurs. The surfactant can be used alone or in a mixture of two or more.

As the preservative fungicide, there are sodium benzoate, sodium pentachlorophenolate, sodium 2-pyridinthiol-1-oxide, sodium sorbate, sodium dehydroacetate, and the like. In order to attain the content of alkali metals of the present invention, it is preferable in particular to use 1,2-dibenzi-isothiazolin-3-one (PROXEL CRL, PROXEL LV, PROXEL BDN and PROXEL GXL of Avecia Co., Ltd., and SANPAC AP of San-ai Oil Co., Ltd.).

As the pH adjusting agent, an arbitrary substance which can adjust pH at a desired value without imparting bad influence to the ink prepared can be used. Examples include the hydroxides of alkali metal element such as lithium hydroxide, sodium hydroxide, potassium hydroxide and the like; the carbonates of alkali metal such as lithium carbonate, sodium carbonate, potassium carbonate and the like, etc. In order to attain the content of alkali metals of the present invention, it is preferable in particular to use an amine such as diethanol amine, triethanol amine or the like; ammonium hydroxide, quaternary ammonium hydroxide, quaternary phosphonium hydroxide, and the like. Additionally, an antirust, a water soluble ultraviolet absorbent, a water soluble infrared absorbent and the like can be added, according to requirement.

The ink jet recording apparatus equipped with the recording liquid storing part which stores the recording liquid of the present invention and the recording unit having heads for discharging the recording liquid is illustrated referring to the drawings. Further, example mentioned below are only one of configuration examples, and does not limit the present invention at all.

FIG. 1 is a schematic frontal view of the mechanism part of a serial type ink jet recording apparatus which mounts an ink cartridge equipped with the recording liquid storing part which stored the recording liquid of the present invention. The mechanism part of a serial type ink jet recording apparatus horizontally constructs the main supporting guide rod (3) and the sub supporting guide rod (4) between the side boards (1) and (2) of both sides at an about horizontally positional relation, and the carriage unit (5) is supported by the main supporting guide rod (3) and the sub supporting guide rod (4) in a condition in which it can be freely slid to a main scanning direction. The respective four heads (6) which respectively discharge a yellow (Y) ink, a magenta (M) ink, a cyan (C) ink, and a black (Bk) ink are mounted in the carriage unit (5), facing the discharge face (nozzle face) (6a) downward. Further, four ink cartridges (7y), (7m), (7c) and (7k) which are the ink feeding bodies of the respective colors for feeding the respective inks to the four heads (6) are exchangeably mounted on the upper side of the heads (6) of the carriage unit (5).

Then, the carriage unit (5) is linked with the timing belt (11) which was tensed between the drive pulley (drive timing pulley) (9) which is rotated by the main scanning motor (8) and the idler pulley (10), and the carriage unit (5), namely the four heads (6) are designed to be moved to the main scanning direction by controlling the drive of the main scanning motor (8). Further, the sub frames (13) and (14) are provided on the bottom board (12) which connects the side boards (1) and (2), and retain the delivery roller (15) for feeding the blank (16) between the sub frames (13) and (14) to a vice scanning direction which is orthogonalized against the main scanning direction. Further, the vice scanning motor (17) is arranged at the sub frame (14) side, and the gear (18) which was fixed on the rotational shaft of the vice scanning motor (17) and the gear (19) which was fixed on the rotational shaft of the delivery roller (15) are provided for transmitting the rotation of the vice scanning motor (17) to the delivery roller (15).

The reliability restoration mechanism (21) (hereinafter, referred to as "sub system") of the heads (6) is arranged between the side board (1) and the sub frame (13). The sub system (21) retains the four cap procedure (22) which caps the discharge faces of the respective heads (6), by the holder (23). The holder (23) is retained by the link member (24) in a condition in which it can be swung. The carriage unit (5) hits the hooking part (25) which was provided at the holder (23), by the movement of the carriage unit (5) to the main scanning direction. Thus, the holder (23) is lifted up in accordance with the movement of the carriage unit (5), and the discharge faces (6a) of the ink jet heads (6) are capped by the four cap procedures (22). When the carriage unit (5) moves to the printing region side, the holder (23) is lifted down in accordance with the movement of the carriage unit (5). Thus, the four cap procedures (22) leave the discharge faces (6a) of the ink jet heads (6).

Further, the four cap procedures (22) are respectively connected with the suction pumps (27) through the suction tubes (26), form the atmosphere release orifice (47), and connected with air through the air release tubes (26) and the air release valves. Further, the suction pumps (27) discharge waste liquid which was sucked, in a waste liquid storing vessel which is not illustrated, through drain tubes and the like. Further, the wiper blade (28) which is a wiping procedure consisting of an elastic member which is made of a fiber member, a foaming member or a rubber for wiping the discharge faces (6a) of the ink jet heads (6), is installed on the blade arm (29). The blade arm (29) is supported by a shaft in a condition in which it can be swung, and swung by the rotation of the cam which is rotated by a rotational procedure not illustrated.

Figure 2:
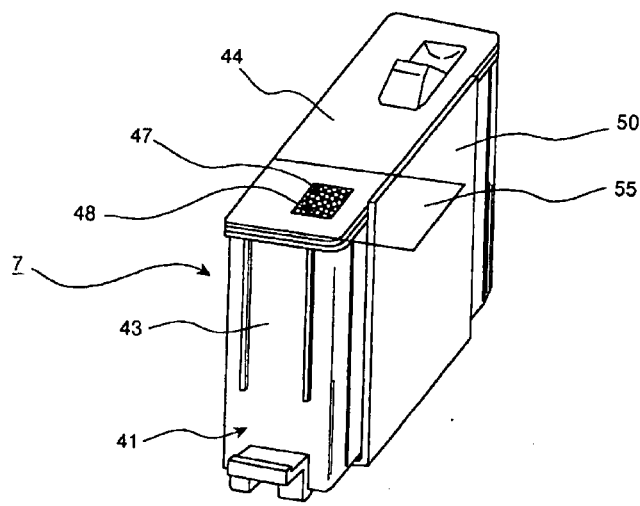
FIG. 2 is a cross-eyed appearance view of an ink cartridge before being mounted on the recording apparatus in the present invention.
Figure 3:
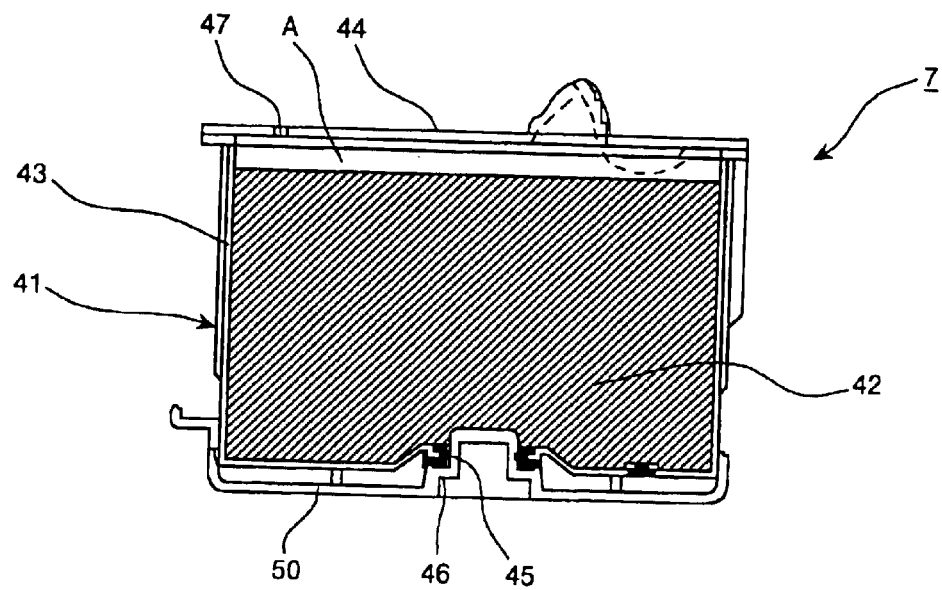
FIG. 3 is a frontal section view of an ink cartridge in the present invention.

Then, the ink cartridges (7) are illustrated referring to FIG. 2 and FIG. 3. FIG. 2 is a cross-eyed appearance view of the ink cartridges before being mounted on the recording apparatus. FIG. 3 is a frontal section view of the ink cartridge. As shown in FIG. 3, the ink cartridges (7) store the ink absorber (42) which absorbed requisite color inks in the cartridge main body (41). The cartridge main body (41) is formed by adhering or melt-adhering the upper cover member (44) on the upper opening of the case (43) which has a wide opening at the upper part, and for example, is composed of a resin molded article. Further, the ink absorber (42) is composed of a porous body such as a urethane foam body or the like, inserted in the cartridge main body (41) by being compressing, and then absorbs the ink.

The ink feeding orifice (45) for feeding the ink to the recording head (6) is formed on the bottom part of the case

(43) of the cartridge main body (41), and the seal ring is fixed by being fit in the inner peripheral of the ink feeding orifice (45). Further, the atmosphere release orifice (47) is formed on the upper cover member (44). Then, on the cartridge main body (41), the cap member (50) is mounted for blocking the ink feeding orifice (45) in the pre-mounting condition and preventing the leak of the inner ink by deforming by compression the case (43) at treating the cartridge at mounting or during delivering, or by a pressure which is added to the board width side wall at vacuum packaging.

Further, as shown in FIG. 2, the atmosphere release orifice (47) adheres by paste the film shape seal member (55) having an oxygen permeation coefficient of 100 ml/m$^2$ or more on the upper cover member (44) to seal it. The seal member (55) is designed to be a size which seals the atmosphere release orifice (47) and also a plural number of grooves (48) which were formed around it. Further, when the cartridges (7) are packed under reduced pressure using a packaging member such as an aluminum laminate film or the like which has no permeation property, a gas occasionally dissolves in the ink at filling the ink, or because of the atmosphere which exists in a space (A) (refer to FIG. 3) which occurs between the ink absorber (42) and the cartridge main body (41). At this time, since the atmosphere release orifice (47) is sealed by the seal member (55) having an oxygen permeation coefficient of 100 ml/m$^2$ or more, air in the ink is discharged in a space having high vacuum between the packaging member out of the cartridge main body (41) through the seal member (55), the degree of degassing is improved.

Figure 4:
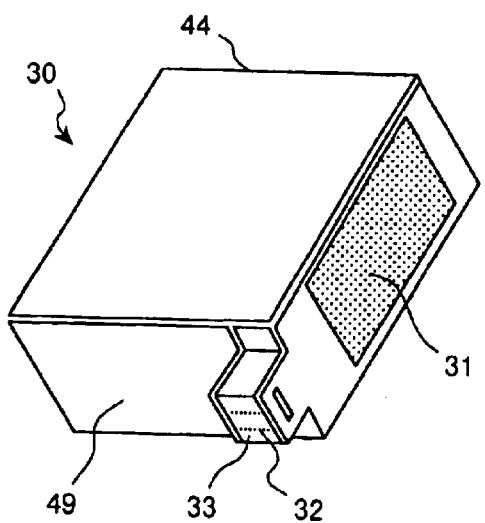
FIG. 4 is a cross-eyed appearance view of a recording unit which is integrated with a recording head of the present invention.

FIG. 4 is a configuration example of a recording unit equipped with the recording liquid storing part which stored the recording liquid of the present invention and the head part for discharging the drops of the recording liquid. The recording is a serial type and the main part is composed of the ink jet head (33), the ink tank (49) which stores the recording liquid fed to the ink jet head (33), and the cover member (44) which closes the inside of the ink tank (49). A plural number of nozzles (32) are formed on the ink jet head (33). The recording liquid is introduced from the ink tank (49) to a common liquid chamber which is not illustrated, through the ink feeding tubes which are not illustrated, and discharged from the nozzles (32) in accordance with signals from the recording apparatus main body which are input by the electrodes (31). Such type recording unit is a structure which is often used for heads which can be produced at low cost, namely heads called thermal system or a bubble system which use thermal energy as a drive source.

Figure 5:
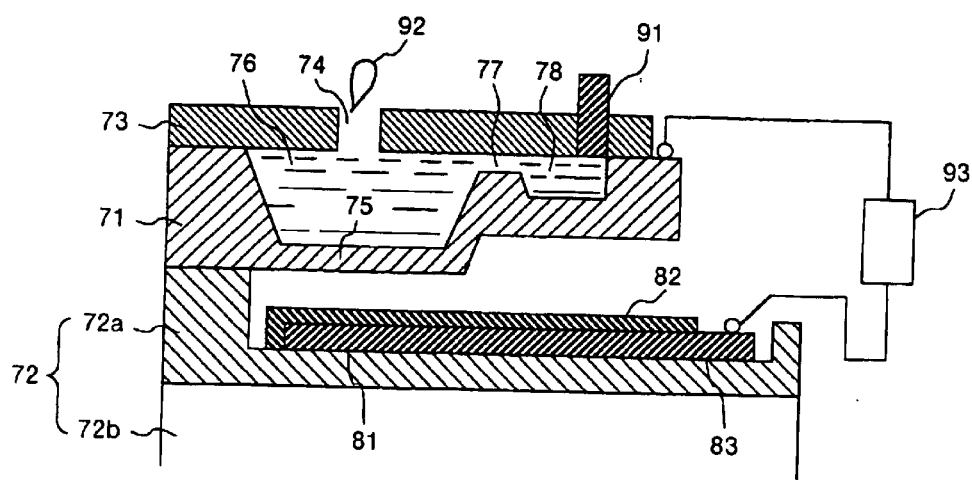
FIG. 5 is a sectional side view of the whole head part of the present invention.

The head part for discharging ink drops is illustrated showing the configuration example of FIG. 5. The head of the configuration example is a laminated structure which was obtained by laminating three silicon single crystal substrates (71), (72) and (73) to be connected. The use of single crystal silicon substrate is preferable for processing of preparing a thin vibration plate (a thickness of several $\mu$m) for discharging an ink, and preferable material when a gap of several $\mu$m is precisely formed at anode conjunction described later. Further, when the vibration plate is vibrated by acting electrostatic force, it is necessary to generate electrostatic force by impressing a voltage to the electrodes. Since silicon is a semiconductor and makes resistance low, it can replace the electrodes of the vibration plate side, and has advantages that the electrodes are not necessary to be individually provided at the vibration plate side, and the like.

The intermediary first substrate (71) has the concave part which constitutes the liquid chamber (76) in which the bottom wall is the vibration plate (75), the narrow grooves for the ink flow orifice which constitutes the fluid resistance part (77) which was provided at rear part of the concave part, and the concave part which constitutes the common ink cavity for feeding an ink to the liquid chamber (76).

The second substrate (72) of lower side which is connected with the under face of the first substrate (71) is a layer in which the silicon oxide film of (72a) was provided on the single crystal silicon substrate of (72b). The electrode (81) which is about the same shape as the vibration plate (75) is formed at the second substrate (72). The electrode (81) has the terminal part (83), and the whole part of the electrode (81) and the lead part of the electrode is covered with the insulation film (82) excluding the (electrode) terminal part (83) of the electrode. As the second substrate (72), a substrate using, for example, a Pyrex glass and the like other than silicon are known.

Then, the nozzle hole (74), the liquid chamber (76), the fluid resistance part (77) and the ink cavity (78) are constituted by the third substrate (73) at upside which is connected with the upper face of the first substrate (71). Then, the ink feeding orifice (91) which is connected with the ink cavity (78) is provided by drilling in the third substrate (73). The ink feeding orifice (91) is connected with an ink cartridge which is not illustrated, through connection pipes and the tubes which are not illustrated. As the third substrate (73), a substrate using, for example, a glass, nickel, a plastic, stainless and the like other than silicon is known.

In the ink jet head of the configuration example which utilizes electrostatic force which was constituted as described above, when a positive pulse voltage is impressed to the electrode (81) from the oscillation circuit (93), the surface of the electrode (81) is electrified to a plus electric potential, the lower face of the corresponding vibration plate (75) is electrified to a minus electric potential, and the vibration plate (75) is bent downward by the electrostatic suction action. When the impression of the pulse voltage to the electrode (81) is switched OFF, the bent vibration plate (75) restores its original posture, therefore the pressure in the liquid chamber (76) increases abruptly, the drops of ink liquid (92) is formed from the nozzle hole (74) and the discharge of the ink is carried out to a image receiving body which is not illustrated. Then, when the vibration plate (75) is bent again downward, the ink is fed in the liquid chamber (76) from the ink cavity (78) through the fluid resistance part (77). As described above, those switching the pulse voltage to ON/OFF and an alternate current and the like are applied to the oscillation circuit (93). When the recording is carried out, it is carried out by controlling the electric pulse which should be impressed to the electrodes (81) of the respective nozzle holes (74).

The ink of the present invention can suppress the elution of silicon and silicon oxide which are used for a printer having the above-mentioned configuration example, prevents problems such as the lowering of image quality caused by the fluctuation of the size of ink drops by lowering the design precision of a printer, the occurrence of discharge inferiority, and the trouble caused by the lowering of the connection strength of the conjunction part, and can prevent the clogging caused by the elution of silicon to the ink.

EXAMPLES

The Examples and Comparative Examples of the present invention is shown below. Further, the addition ratio indicates the % by weight of effective components unless otherwise described in particular.

Example 1

| | |
|---|---|
| Black dye of the formula described below | 3% by weight [Formula 36] |

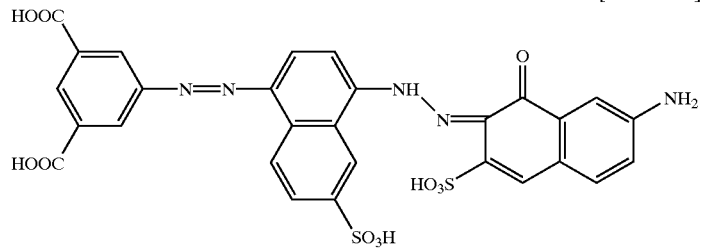

| | |
|---|---|
| Glycerin | 5% by weight |
| Ethylene glycol | 20% by weight |
| Sodium polyoxyethylene (3) tridecyl ether acetate (anion-based surfactant manufactured by Nikko Chemicals Co., Ltd.) | 1% by weight |
| SANPAC AP (fungicide manufactured by San-ai Oil Co., Ltd.) | 0.4% by weight |
| Tetrabutylphosphonium hydroxide (corrosion inhibitor manufactured by ALDRICH Chemical Co., Ltd.) | 1.0% by weight |
| Ion exchange water | 1.0% by weight |

The mixture of the above-mentioned prescription was continued to be stirred at 50° C. for 4 hours, cooled, and then filtration was carried out by a filter having a pore diameter of 0.1 μm. When the ink was analyzed by plasma emission spectral analysis, the content of alkali metals in the ink was 814 ppm. Further, pH value was 9.5.

The ink was filled in the ink jet printer having a system in which the vibration plate (75) consists of a face on which silicon oxide film is provided on (110) plane by 1000 Å by thermal oxidation treatment, and the vibration plate (75) is deformed to discharge by electrostatic force consisting of Pyrex glass #7740, the liquid chamber (76) consisting of silicon of (100) plane, (110) plane and (111) plane, and the fluid resistance part (77). The printing test and reliability test described below were carried out under the conditions below.
Drive frequency: 12 KHz
Drive voltage: 23V
Nozzle diameter: 30 μm
Volume of liquid drops: 30 pl/dot
Nozzle number: 48 nozzles
Dot density: 600 dpi
Test 1 (T1) Initial Printing Test
Printing was carried out on three kind of commercial blanks and three kinds of bond papers, and the characteristic of an image was studied.
Test 2 (T2) Reliability Test (Printing Test after Stopping Printing, Liquid Contact Property)
After the printer was left alone under the environment of 50° C. and 60% RH for one month while filling the ink in the above-mentioned printer, printing was carried out, and whether a normal printing is possible or not was tested. Further the variation amount of the thickness of a glass and silicon and the variation amount of the film thickness of the oxide film were measured. Further, the variation amount of the thickness of a glass and silicon was determined by analyzing the ink after being brought in contact by plasma emission spectral analysis, and converting from the concentration of silicon in the ink and the density of the respective materials.

In the initial printing test, clear images having an image concentration of 1.3 or more were also obtained on any of the papers. A normal printing could be carried out at printing after stopping printing without using any restoration procedure. In the liquid contact property, the variation of the thickness of Pyrex glass #7740 was 0.18 μm, the variation amount of the thickness of silicon was about 0.16 μm at (100) plane, about 0.06 μm at (110) plane, and about 0.04 μm at (111) plane, and the variation amount of the thickness was no problem as the liquid chamber, the fluid resistance part and the nozzle. Further, the variation amount of the thickness of the silicon oxide film at (110) plane was about 3 Å, and the variation amount of the thickness was no problem as the vibration plate.

Comparative Example 1

In the ink prescription of Example 1, pH was adjusted by adding lithium hydroxide in place of the corrosion inhibitor. After stirring at 50° C. for 4 hours, cooled, and filtration was carried out by a filter having a pore diameter of 0.1 μm. When the ink was analyzed by plasma emission spectral analysis, the content of alkali metals in the ink was 940 ppm. Further, pH value was 9.8. The ink was filled in the printer in like manner as in Example 1, and the printing test and preservation test described below were carried out. An initial image which is similar as in Example 1 was obtained, but in the injection response test after stopping printing, since the dissolution stability of the dye becomes worse caused by the elution of silicon to the ink, the discharge inferiority occurred at 8/48 nozzles. In the liquid contact property, the variation of the thickness of Pyrex glass #7740 was 11.2 μm, the variation amount of the thickness of silicon was about 6.0 μm at (100) plane, about 3.5 μm at (110) plane, and about 0.60 μm at (111) plane, and it was the variation amount which generates the precision problem as the liquid chamber, the fluid resistance part and the nozzle. Further, all of the silicon oxide film at (110) plane was eluted, and it was the variation amount which becomes a problem as the vibration plate.

Example 2

| | |
|---|---|
| Black dye of the formula described below | 3% by weight [Formula 36] |
| Glycerin | 5% by weight |
| Ethylene glycol | 20% by weight |
| Polyoxyethylene (3) tridecyl ether acetic acid (anion surfactant) | 1.0% by weight |
| SANPAC AP (fungicide manufactured by San-ai Oil Co., Ltd.) | 0.4% by weight |
| Ion exchange water | residual amount |

While the mixture of the above-mentioned prescription was stirred at 50° C., a 14.4% aqueous solution of corrin (Formula B) hydroxide was added by 70% based on the equivalent of the anionic compound in the ink. The mixture was continued to be stirred for 4 hours, cooled, and then filtration was carried out by a filter having a pore diameter of 0.1 μm. When the ink was analyzed by plasma emission spectral analysis, the content of alkali metals in the ink was 15 ppm. Further, pH value was 9.6.

The ink was filled in the ink jet printer having a system in which the vibration plate consists of a face on which silicon oxide film is provided by 1000 Å by thermal oxidation treatment, and the vibration plate is deformed to discharge by electrostatic force consisting of Pyrex glass #7740, the liquid chamber consisting of silicon of (100) plane, (110) plane and (111) plane, and the fluid resistance. The printing test and reliability test described below were carried out under the conditions below.

Drive frequency: 12 KHz
Drive voltage: 23V
Nozzle diameter: 30 μm
Volume of liquid drops: 30 pl/dot
Nozzle number: 48 nozzles
Dot density: 600 dpi Test 1 (T1) Initial Printing Test Printing was carried out on three kind of commercial blanks and three kinds of bond papers, and the characteristic of an image was studied.

Test 2 (T2) Reliability Test (Printing Test after Stopping Printing, Liquid Contact Property)

After the printer was left alone under the environment of 50° C. and 60% RH for one month while filling the ink in the above-mentioned printer, printing was carried out, and whether a normal printing is possible or not was tested. Further, the variation amount of the thickness of a glass and silicon and the variation amount of the film thickness of the oxide film were measured. Further, the variation amount of the thickness of a glass and silicon was determined by analyzing the ink after being brought in contact by plasma emission spectral analysis, and converting from the concentration of silicon in the ink and the density of the respective materials.

In the initial printing test, clear images having an image concentration of 1.3 or more were also obtained on any of the papers. A normal printing could be carried out at printing after stopping printing without using any restoration procedure. In the liquid contact property, the variation of the thickness of Pyrex glass #7740 was 0.18 μm, the variation amount of the thickness of silicon was about 0.16 μm at (100) plane, about 0.06 μm at (110) plane, and about 0.04 μm at (111) plane, and the variation amount of the thickness was no problem as the liquid chamber, the fluid resistance part and the nozzle. Further, the variation amount of the thickness of the siliconoxide film at (110) plane was about 3 Å, and the variation amount of the thickness was no problem as the vibration plate.

Comparative Example 2

In the ink prescription of Example 2, lithium hydroxide in place of corrin was added by 70% based on the equivalent of the anionic compound in the ink. After the mixture was continued to be stirred for 4 hours and cooled, and filtration was carried out by a filter having a pore diameter of 0.1 μm. When the ink was analyzed by plasma emission spectral analysis, the content of alkali metals in the ink was 940 ppm. Further, pH value was 9.8. The ink was filled in the printer in like manner as in Example 2, and the printing test and preservation test were carried out. An initial image which is similar as in Example 2 was obtained, but in the injection response test after stopping printing, since the dissolution stability of the dye becomes worse caused by the elution of silicon to the ink, the discharge inferiority occurred at 8/48 nozzles. In the liquid contact property, the variation of the thickness of Pyrex glass #7740 was 11.2 μm, the variation amount of the thickness of silicon was about 6.0 μm at (100) plane, about 3.5 μm at (110) plane, and about 0.60 μm at (111) plane, and it was the variation amount which generates the precision problem as the liquid chamber, the fluid resistance part and the nozzle. Further, all of the silicon oxide film at (110) plane was eluted, and it was the variation amount which becomes a problem as the vibration plate.

Example 3

| | |
|---|---|
| Cyan dye of the formula described below | 3% by weight [Formula 37] |

$$[\text{Cu phthalocyanine}(SO_2NH_2)_{2\text{-}3}(SO_3H)_{1\text{-}2}]$$

| | |
|---|---|
| Glycerin | 10% by weight |
| Diethylene glycol | 10% by weight |
| SURFYNOL 465 | 1.0% by weight |
| (addition product of acetylene alcohol to ethylene oxide; nonionic surfactant manufactured by Air Products and Chemicals Inc.) | |
| Diethyleneglycol monobutyl ether | 3% by weight |
| PROXEL CRL | 0.4% by weight |
| (Fungicide manufactured by Avecia Co., Ltd.) | |
| Tetrabutylphosphonium hydroxide | 0.5% by weight |
| (corrosion inhibitor manufactured by Aldrich Chemicals, Co., Ltd.) | |
| Ion exchange water | residual amount |

While the mixture of the above-mentioned prescription was stirred at 50° C., the mixture was continued to be stirred for 4 hours, cooled, and then filtration was carried out by a filter having a pore diameter of 0.1 μm. When the ink was analyzed by plasma emission spectral analysis, the content of alkali metals in the ink was 913 ppm. Further, pH value was 9.2.

The printing test and reliability test of the ink were carried out using the printer in which the head having the above-mentioned configuration which is shown in FIG. 5 was mounted. Further, as the head having the configuration of FIG. 5, a head prepared under conditions described below was used. The first substrate (71) is composed of p-type single crystal silicon of (110) plane direction whose both planes were polished, the second substrate (72) is composed of p-type single crystal silicon (72b) of (100) plane direction whose both planes were polished and the thermally oxidized film (72a), the respective concave parts corresponding to the liquid chamber (76), the fluid resistance part (77), the ink cavity (78) and the like were formed by carrying out the anisotropic etching of these substrates by a mask and alkali liquid as shown in FIG. 5, and further, the electrode (81), the electrode lead own in part, the electrode terminal (83), and the insulation film (82) were formed. The thickness of the vibration plate (75) was 20 μm, and the silicon oxide film was provided by 1000 Å by thermal oxidation treatment.

Further, as shown in FIG. 5, the nozzle hole (74), the ink feeding orifice (91) and the like are formed by the anisotropic dry etching on n-type single crystal silicon wafer of (100) plane direction whose both planes were polished, the third substrate (73) is connected, the oscillation circuit (93) and the like are connected as shown in the drawing, and the printing was carried out by impressing positive pulse voltage was impressed to the electrode terminal (83).

Accordingly, the plane which is brought in contact with the ink is composed of the plane in which the vibration plate (75) provided the silicon oxide film by 1000 Å by thermal oxidation treatment, the liquid chamber (76) is composed of silicon of (100) plane, (110) plane and (111) plane, the nozzle hole (74) is composed of silicon of (100) plane and the plane of the anisotropic dry etching, the fluid resistance part (77) is composed of silicon of silicon of (100) plane and (110) plane.

The printing conditions of the printer was carried out as described below.
Drive frequency: 12 KHz
Drive voltage: 23V
Nozzle diameter: 30 μm
Volume of liquid drops: 30 pl/dot
Nozzle number: 48 nozzles
Dot density: 600 dpi
Test 1 (T1) Initial Printing Test
  Printing was carried out on three kind of commercial blanks and three kinds of bond papers, and the characteristic of an image was studied.
Test 2 (T2) Reliability Test (Printing Test After Stopping Printing, Silicon Liquid Contact Property)
  After the printer was left alone under the environment of 50° C. and 60% RH for one month while filling the ink in the above-mentioned printer, printing was carried out, and whether a normal printing is possible or not was tested. Further, the variation amount of the thickness of a glass and silicon and the variation amount of the film thickness of the oxide film were measured. Further, the variation amount of the thickness of silicon and the variation amount of the film thickness of the oxide film were measured.

In the initial printing test, clear images having an image concentration of 1.3 or more were also obtained on any of the papers. A normal printing could be carried out at printing after stopping printing without using any restoration procedure. In the liquid contact property, the variation amount of the thickness of silicon was about 0.15 μm at (100) plane, about 0.06 μm at (110) plane, and about 0.04 μm at (111) plane, and the variation amount of the thickness was no problem as the liquid chamber, the fluid resistance part and the nozzles. Further, the variation amount of the thickness of the siliconoxide film at (110) plane was about 3 Å, and the variation amount of the thickness was no problem as the vibration plate.

Comparative Example 3

In the ink prescription of Example 3, sodium hydroxide was added in place of the corrosion inhibitor, and pH was adjusted. After the mixture was continued to be stirred at 50° C. for 4 hours and cooled, and filtration was carried out by a filter having a pore diameter of 0.1 μm. When the ink was analyzed by plasma emission spectral analysis, the content of alkali metals in the ink was 1280 ppm. Further, pH value was 10.3. The ink was filled in the printer in like manner as in Example 3, and the printing test and preservation test were carried out. An initial image which is similar as in Example 3 was obtained by the ink, but in the injection response test after stopping printing, since the dissolution stability of the dye becomes worse caused by the elution of silicon to the ink, the discharge inferiority occurred at 28/48 nozzles. In the liquid contact property of silicon, the variation amount of the thickness of silicon was about 8.2 μm at (100) plane, about 4.7 μm at (110) plane, and about 0.80 μm at (111) plane, and it was the variation amount which generates the precision problem as the liquid chamber, the fluid resistance part and the nozzles. Further, all of the silicon oxide film at (110) plane was eluted, and since the vibration plates of 8/48 were made thin, they cannot endure the vibration and were destroyed.

Example 4 by a filter having a pore diameter of 0.1 μm. When the ink was analyzed by plasma emission spectral analysis, the content of alkali metals in the ink was 12 ppm. Further, pH value was 9.1.

When the above-mentioned ink was tested in like manner as in Example 2, in the initial printing test, clear images having an image concentration of 1.1 or more were also obtained on any of the papers. A normal printing could be carried out at printing after stopping printing without using any restoration procedure. In the liquid contact property, the variation of the thickness of Pyrex glass #7740 was 0.91 μm, the variation amount of the thickness of silicon was about 0.15 μm at (100) plane, about 0.06 μm at (110) plane, and about 0.04 μm at (111) plane, and the variation amount of the thickness was no problem as the liquid chamber, the fluid resistance part and the nozzles. Further, the variation amount of the thickness of the silicon oxide film at (110) plane was about 3 Å, and the variation amount of the thickness was no problem as the vibration plate.

Comparative Example 4

In the ink prescription of Example 4, sodium hydroxide in place of triethanol amine was added by 130% based on the equivalent of the anionic compound in the ink. After the mixture was continued to be stirred for 4 hours and cooled, and filtration was carried out by a filter having a pore diameter of 0.1 μm. When the ink was analyzed by plasma emission spectral analysis, the content of alkali metals in the ink was 1280 ppm. Further, pH value was 10.3. The ink was filled in the printer in like manner as in Example 4, and the printing test and preservation test were carried out. An initial image which is similar as in Example 4 was obtained by the ink, but in the injection response test after stopping printing, since the dissolution stability of the dye becomes worse

| | |
|---|---|
| Cyan dye of the formula described below | 3% by weight |
| | [Formula 37] |

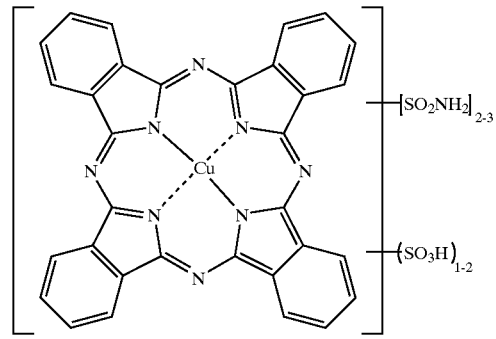

| | |
|---|---|
| Glycerin | 10% by weight |
| Diethylene glycol | 10% by weight |
| SURFYNOL 465 | 1.0% by weight |
| (addition product of acetylene alcohol to ethylene oxide; (nonionic surfactant) manufactured by Shin-Etsu Chemical Co., Ltd.) | |
| Diethyleneglycol monobutyl ether | 3% by weight |
| PROXEL CRL (Fungicide manufactured by Avecia Co., Ltd.) | 0.4% by weight |
| Ion exchange water | residual amount |

While the mixture of the above-mentioned prescription was stirred at 50° C., triethanol amine (Formula C) was added by 170% based on the equivalent of the anionic compound in the ink. The mixture was continued to be stirred for 4 hours, cooled, and then filtration was carried out caused by the elution of silicon to the ink, the discharge inferiority occurred at 28/48 nozzles. In the liquid contact property, the variation of the thickness of Pyrex glass #7740 was 13.9 μm, the variation amount of the thickness of silicon was about 8.2 μm at (100) plane, about 4.7 μm at (110)

plane, and about 0.80 μm at (111) plane, and it was the variation amount which generates the precision problem as the liquid chamber, the fluid resistance part and the nozzles. Further, all of the silicon oxide film at (110) plane was eluted, and since the vibration plates of 8/48 were made thin, they cannot endure the vibration and were destroyed.

Example 5

| Yellow dye of the formula described below | 2% by weight |
|---|---|

[Formula 33]

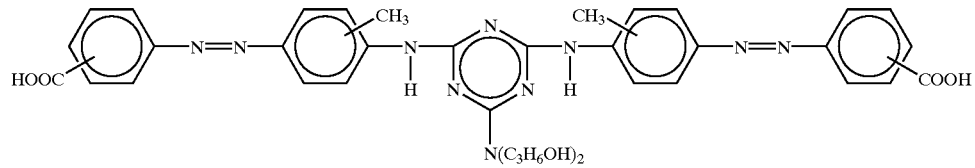

| Glycerin | 3% by weight |
|---|---|
| Triethylene glycol | 10% by weight |
| Dialkylsulfo succinic acid salt of the formula described below | 1.0% by weight |

[Formula 39]

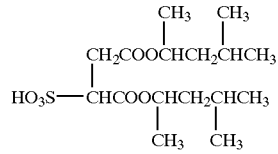

| 2-ethyl-1,3-hexanediol | 2% by weight |
|---|---|
| PROXEL BND (fungicide manufactured by Avecia Co., Ltd.) | 0.4% by weight |
| Ion exchange water | residual amount |

While the mixture of the above-mentioned prescription was stirred at 50° C., the hydroxide of the phosphonium compound of the general formula (Formula 1) was added by 40% based on the equivalent of the anionic compound in the ink, and the hydroxide of the tetrabutylphosphonium compound of the general formula (Formula 3) was added by 40% based on the equivalent of the anionic compound in the ink. The mixture was continued to be stirred for 4 hours and cooled, and then filtration was carried out by a filter having a pore diameter of 0.1 μm. When the ink was analyzed by plasma emission spectral analysis, the content of alkali metals in the ink was 29 ppm. Further, pH value was 9.7.

When the above-mentioned ink was tested in like manner as in Example 1 (non alkali glass substrate was used in place of Pyrex glass #7740), in the initial printing test, clear images having an image concentration of 0.9 or more were also obtained on any of the papers. A normal printing could be carried out at printing after stopping printing without using any restoration procedure. In the liquid contact property, the variation of the thickness of non alkali glass substrate (OA-2B manufactured by Nippon Electric Glass Co., Ltd.) was 0.19 μm, the variation amount of the thickness of silicon was about 0.15 μm at (100) plane, about 0.07 μm at (110) plane, and about 0.05 μm at (111) plane, and the variation amount of the thickness was no problem as the liquid chamber, the fluid resistance part and the nozzle. Further, the variation amount of the thickness of the silicon oxide film at (110) plane was about 3 Å, and the variation amount of the thickness was no problem as the vibration plate.

Comparative Example 5

In the ink prescription of Example 5, potassium hydroxide was added by 40% based on the equivalent of the anionic compound in the ink in place of the general formulae (Formula 1) and (Formula 2), and lithium hydroxide was added by 40% based on the equivalent of the anionic compound in the ink. After the mixture was continued to be stirred for 4 hours and cooled, and filtration was carried out by a filter having a pore diameter of 0.1 μm. When the ink was analyzed by plasma emission spectral analysis, the content of alkali metals in the ink was 970 ppm. Further, pH value was 9.6. The ink was filled in the printer in like manner as in Example 5, and the printing test and preservation test were carried out. An initial image which is similar as in Example 5 was obtained by the ink, but in the injection response test after stopping printing, since the dissolution stability of the dye becomes worse caused by the elution of silicon to the ink, the discharge inferiority occurred at 12/48 nozzles. In the liquid contact property, the variation of the thickness of non alkali glass substrate (OA-2B manufactured by Nippon Electric Glass Co., Ltd.) was 13.9 μm, and in the liquid contact property of silicon, the variation amount of the thickness of silicon was about 6.2 μm at (100) plane, about 3.6 μm at (110) plane, and about 0.60 μm at (111) plane, and it was the variation amount which generates the precision problem as the liquid chamber, the fluid resistance part and the nozzles. Further, all of the silicon oxide film at (110) plane was eluted, and it was the variation amount which becomes a problem as the vibration plate.

Example 6

| | |
|---|---|
| Yellow dye of the formula described below | 2% by weight |

[Formula 38]

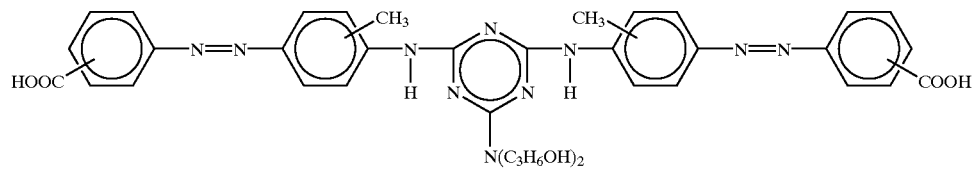

| | |
|---|---|
| Glycerin | 3% by weight |
| Triethylene glycol | 10% by weight |
| Dialkylsulfo succinic acid salt of the formula described below | 1.0% by weight |

[Formula 39]

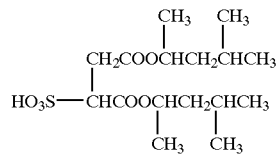

| | |
|---|---|
| 2-ethyl-1,3-hexanediol | 2% by weight |
| PROXEL BND (fungicide manufactured by Avecia Co., Ltd.) | 0.4% by weight |
| Ion exchange water | residual amount |

While the mixture of the above-mentioned prescription was stirred at 50° C., tetramethylammonium (Formula D) was added by 40% based on the equivalent of the anionic compound in the ink, and ammonium ion (Formula E) was added by 40% based on the equivalent of the anionic compound in the ink. The mixture was continued to be stirred for 4 hours and cooled, and then filtration was carried out by a filter having a pore diameter of 0.1 μm. When the ink was analyzed by plasma emission spectral analysis, the content of alkali metals in the ink was 28 ppm. Further, pH value was 9.7. When the above-mentioned ink was tested in like manner as in Example 2, in the initial printing test, clear images having an image concentration of 0.9 or more were also obtained on any of the papers. A normal printing could be carried out at printing after stopping printing without using any restoration procedure. In the liquid contact property, the variation of the thickness of Pyrex glass #7740 was 0.24 μm, the variation amount of the thickness of silicon was about 0.18 μm at (100) plane, about 0.07 μm at (110) plane, and about 0.05 μm at (111) plane, and the variation amount of the thickness was no problem as the liquid chamber, the fluid resistance part and the nozzle. Further, the variation amount of the thickness of the silicon oxide film at (110) plane was about 3 Å, and the variation amount of the thickness was no problem as the vibration plate.

Comparative Example 6

In the ink prescription of Example 6, potassium hydroxide was added by 40% based on the equivalent of the anionic compound in the ink, and lithium hydroxide was added by 40% based on the equivalent of the anionic compound in the ink, in place of tetramethylammonium and ammonium ion. After the mixture was continued to be stirred for 4 hours and cooled, and filtration was carried out by a filter having a pore diameter of 0.1 μm. When the ink was analyzed by plasma emission spectral analysis, the content of alkali metals in the ink was 970 ppm. Further, pH value was 9.6. The ink was filled in the printer in like manner as in Example 6, and the printing test and preservation test were carried out. An initial image which is similar as in Example 6 was obtained by the ink, but in the injection response test after stopping printing, since the dissolution stability of the dye becomes worse caused by the elution of silicon to the ink, the discharge inferiority occurred at 12/48 nozzles. In the liquid contact property, the variation of the thickness of Pyrex glass #7740 was 10.9 μm, and in the liquid contact property of silicon, the variation amount of the thickness of silicon was about 6.2 μm at (100) plane, about 3.6 μm at (110) plane, and about 0.60 μm at (111) plane, and it was the variation amount which generates the precision problem as the liquid chamber, the fluid resistance part and the nozzles. Further, all of the silicon oxide film at (110) plane was eluted, and it was the variation amount which becomes a problem as the vibration plate.

Example 7

| | |
|---|---|
| Magenta dye of the formula described below | 2.5% by weight [Formula 40] |

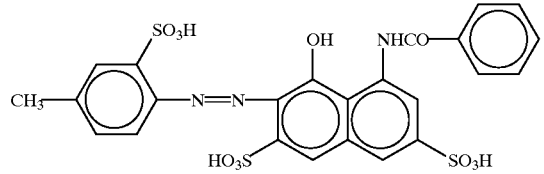

| | |
|---|---|
| Diethylene glycol | 20% by weight |
| Sodium polyoxyethylene (6) tridecyl ether acetate (anionic surfactant manufactured by Nikko Chemicals Co., Ltd.) | 0.3% by weight |
| 2-pyrrolidone | 2% by weight |
| PROXEL GXL (fungicide manufactured by Avecia Co., Ltd.) | 0.4% by weight |
| SURFYNOL 61 (3,5-dimethyl-1-hexyn-3-ol) | 0.9% by weight |
| Ion exchange water | residual amount |

The mixture of the above-mentioned prescription was continued to be stirred at 50° C. for 4 hours and cooled, and then filtration was carried out by a filter having a pore diameter of 0.1 μm. When the ink was analyzed by plasma emission spectral analysis, the content of alkali metals in the ink was 460 ppm. Further, pH value was 10.1.

When the above-mentioned ink was tested in like manner as in Example 3, in the initial printing test, clear images having an image concentration of 1.1 or more were also obtained on any of the papers. A normal printing could be carried out at printing after stopping printing without using any restoration procedure. In the liquid contact property of silicon, the variation amount of the thickness of silicon was about 0.32 μm at (100) plane, about 0.10 μm at (110) plane, and about 0.08 μm at (111) plane, and the variation amount of the thickness was no problem as the liquid chamber, the fluid resistance part and the nozzle. Further, the variation amount of the thickness of the silicon oxide film at (110) plane was about 5 Å, and the variation amount of the thickness was no problem as the vibration plate.

Comparative Example 7

In the ink prescription of Example 7, sodium hydroxide was added in place of the corrosion inhibitor, and the adjustment of pH was carried out. After the mixture was continued to be stirred at 50° C. for 4 hours and cooled, and filtration was carried out by a filter having a pore diameter of 0.1 μm. When the ink was analyzed by plasma emission spectral analysis, the content of alkali metals in the ink was 810 ppm. Further, pH value was 10.1. The ink was filled in the printer in like manner as in Example 7, and the printing test and preservation test were carried out. An initial image which is similar as in Example 7 was obtained by the ink, but in the injection response test after stopping printing, since the dissolution stability of the dye becomes worse caused by the elution of silicon to the ink, the discharge inferiority occurred at 4/48 nozzles. In the liquid contact property of silicon, the variation amount of the thickness of silicon was about 5.3 μm at (100) plane, about 3.1 μm at (110) plane, and about 0.50 μm at (111) plane, and it was the variation amount which generates the precision problem as the liquid chamber, the fluid resistance part and the nozzle. Further, all of the silicon oxide film at (110) plane was eluted, and it was the variation amount which becomes a problem as the vibration plate.

Example 8

| | |
|---|---|
| Magenta dye of the formula described below | 2.5% [Formula 40] |

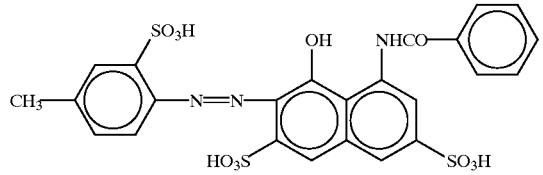

| | |
|---|---|
| Diethylene glycol | 20% |
| Polyoxyethylene (3) tridecyl ether acetic acid (anion surfactant) | 0.3% |
| 2-pyrrolidone | 2% |
| PROXEL GXL (fungicide manufactured by Avecia Co., Ltd.) | 0.4% |
| Ion exchange water | residual amount |

While the mixture of the above-mentioned prescription was stirred at 50° C., a 14.4% aqueous solution of corrin hydroxide (Formula B) was added by 40% based on the equivalent of the anionic compound in the ink, and sodium hydroxide was added by 65% based on the equivalent of the anionic compound in the ink. The mixture was continued to be stirred for 4 hours and cooled, and then filtration was carried out by a filter having a pore diameter of 0.1 μm. When the ink was analyzed by plasma emission spectral analysis, the content of alkali metals in the ink was 470 ppm. Further, pH value was 10.0. When the above-mentioned ink was tested in like manner as in Example 2, in the initial printing test, clear images having an image concentration of 1.1 or more were also obtained on any of the papers. A normal printing could be carried out at printing after stopping printing without using any restoration procedure. In the liquid contact property, the variation of the thickness of Pyrex glass #7740 was 0.31 µm, the variation amount of the thickness of silicon was about 0.31 µm at (100) plane, about 0.11 µm at (110) plane, and about 0.09 µm at (111) plane, and the variation amount of the thickness was no problem as the liquid chamber, the fluid resistance part and the nozzle. Further, the variation amount of the thickness of the silicon oxide film at (110) plane was about 5 Å, and the variation amount of the thickness was no problem as the vibration plate.

Comparative Example 8

In the ink prescription of Example 8, sodium hydroxide in place of corrin was added by 65% (105% in total) based on the equivalent of the anionic compound in the ink. After the mixture was continued to be stirred for 4 hours and cooled, and filtration was carried out by a filter having a pore diameter of 0.1 µm. When the ink was analyzed by plasma emission spectral analysis, the content of alkali metals in the ink was 810 ppm. Further, pH value was 10.1. The ink was filled in the printer in like manner as in Example 8, and the printing test and preservation test were carried out. An initial image which is similar as in Example 8 was obtained by the ink, but in the injection response test after stopping printing, since the dissolution stability of the dye becomes worse caused by the elution of silicon to the ink, the discharge inferiority occurred at 4/48 nozzles. In the liquid contact property, the variation of the thickness of Pyrex glass #7740 was 9.8 µm, the variation amount of the thickness of silicon was about 5.3 µm at (100) plane, about 3.1 µm at (110) plane, and about 0.50 µm at (111) plane, and it was the variation amount which generates the precision problem as the liquid chamber, the fluid resistance part and the nozzles. Further, all of the silicon oxide film at (110) plane was eluted, and it was the variation amount which becomes a problem as the vibration plate.

Example 9

| | |
|---|---|
| Carboxyl group-bonded carbon black dispersion liquid (mean particle diameter: 128 nm) | 5% by weight |
| Glycerin | 10% by weight |
| Diethylene glycol | 10% by weight |
| Sodium polyoxyethylene(3) tridecyl ether acetate (anionic surfactant manufactured by Nikko Chemicals Co., Ltd.) | 1.0% by weight |
| 2-pyrrolidone | 2% by weight |
| 2-ethyl-1,3-hexanediol | 2% by weight |
| SANPAC AP (fungicide manufactured by San-ai Oil Co., Ltd.) | 0.4% by weight |
| OLFIN B (3-methyl-1-butyn-3-ol manufactured by Nissin Chemical Industry Co., Ltd.: corrosion inhibitor) | 0.5% by weight |
| Ion exchange water | residual amount |

While the mixture of the above-mentioned prescription was stirred at 50° C., the mixture was continued to be stirred for 4 hours and cooled, and then filtration was carried out by a filter having a pore diameter of 0.8 µm. When the ink was analyzed by plasma emission spectral analysis, the content of alkali metals in the ink was 1020 ppm. Further, pH value was 8.3.

When the above-mentioned ink was tested in like manner as in Example 3, in the initial printing test, clear images having an image concentration of 1.4 or more were also obtained on any of the papers. A normal printing could be carried out at printing after stopping printing without using any restoration procedure. In the liquid contact property of silicon, the variation amount of the thickness of silicon was about 0.20 µm at (100) plane, about 0.0 µm at (110) plane, and about 0.04 µm at (111) plane, and the variation amount of the thickness was no problem as the liquid chamber, the fluid resistance part and the nozzle. Further, the variation amount of the thickness of the silicon oxide film at (110) plane was about 3 Å, and the variation amount of the thickness was no problem as the vibration plate.

Comparative Example 9

In the ink prescription of Example 7, sodium hydroxide in place of the corrosion inhibitor was added and pH was adjusted. After the mixture was continued to be stirred at 50° C. for 4 hours and cooled, and filtration was carried out by a filter having a pore diameter of 0.1 µm. When the ink was analyzed by plasma emission spectral analysis, the content of alkali metals in the ink was 870 ppm. Further, pH value was 8.3. The ink was filled in the printer in like manner as in Example 9, and the printing test and preservation test were carried out. An initial image which is similar as in Example 9 was obtained by the ink, but in the injection response test after stopping printing, since the dissolution stability of the dye becomes worse caused by the elution of silicon to the ink, the discharge inferiority occurred at 7/48 nozzles. In the liquid contact property of silicon, the variation amount of the thickness of silicon was about 5.8 µm at (100) plane, about 3.4 µm at (110) plane, and about 0.60 µm at (111) plane, and it was the variation amount which generates the precision problem as the liquid chamber, the fluid resistance part and the nozzles. Further, all of the silicon oxide film at (110) plane was eluted, and it was the variation amount which becomes a problem as the vibration plate.

Example 10

| | |
|---|---|
| Carboxyl group-bonded carbon black dispersion liquid (mean particle diameter: 128 nm) | 5% |
| Glycerin | 10% |
| Diethylene glycol | 10% |
| Polyoxyethylene(3) tridecyl ether acetic acid (anion surfactant) | 1.0% |
| 2-pyrrolidone | 2% |
| 2-ethyl-1,3-hexanediol | 2% |
| SANPAG AP (fungicide manufactured by San-ai Oil Co., Ltd.) | 0.4% |
| Ion exchange water | residual amount |

The mixture of the above-mentioned prescription was continued to be stirred at 50° C. for 4 hours and cooled, and then filtration was carried out by a filter having a pore diameter of 0.8 µm. When the ink was analyzed by plasma emission spectral analysis, the content of alkali metals in the ink was 320 ppm. Further, pH value was 8.3. When the above-mentioned ink was tested in like manner as in Example 2, in the initial printing test, clear images having an image concentration of 1.4 or more were also obtained on any of the papers. A normal printing could be carried out at printing after stopping printing without using any restoration procedure. In the liquid contact property, the variation of the thickness of Pyrex glass #7740 was 0.23 μm, the variation amount of the thickness of silicon was about 0.20 μm at (100) plane, about 0.07 μm at (110) plane, and about 0.04 μm at (111) plane, and the variation amount of the thickness was no problem as the liquid chamber, the fluid resistance part and the nozzle. Further, the variation amount of the thickness of the silicon oxide film at (110) plane was about 3 Å, and the variation amount of the thickness was no problem as the vibration plate.

Comparative Example 10

In the ink prescription of Example 8, the ink was prepared in like manner as in Example 8 and tested except that sodium polyoxyethylene(3) tridecyl ether acetate in place of polyoxyethylene(3) tridecyl ether acetic acid was added. When the ink was analyzed by plasma emission spectral analysis, the content of alkali metals in the ink was 870 ppm. Further, pH value was 8.3. The ink was filled in the printer in like manner as in Example 10, and the printing test and preservation test were carried out. An initial image which is similar as in Example 10 was obtained by the ink, but in the injection response test after stopping printing, since the dissolution stability of the dye becomes worse caused by the elution of silicon to the ink, the discharge inferiority occurred at 7/48 nozzles. In the liquid contact property, the variation of the thickness of Pyrex glass #7740 was 11.1 μm, the variation amount of the thickness of silicon was about 5.8 μm at (100) plane, about 3.4 μm at (110) plane, and about 0.60 μm at (111) plane, and it was the variation amount which generates the precision problem as the liquid chamber, the fluid resistance part and the nozzles. Further, all of the silicon oxide film at (110) plane was eluted, and it was the variation amount which becomes a problem as the vibration plate.

Example 11

A cationic carbon black dispersion liquid (manufactured by Cavot Specialty Chemicals) in place of the black dye of Example 1 was added by 5% by solid content, the ink of the under-mentioned prescription excluding tetrabutylphosphonium hydroxide was used, and the mixture was continued to be stirred at 50° C. for 4 hours and cooled, and then filtration was carried out by a filter having a pore diameter of 0.8 μm.

| | |
|---|---|
| Cationic carbon black dispersion liquid | 5% by weight |
| Glycerin | 5% by weight |
| Ethylene glycol | 20% by weight |
| OLFIN E1010 | 1.0% by weight |
| SANPAC AP (fungicide manufactured by San-ai Oil Co., Ltd.) | 0.4% by weight |
| Ion exchange water | residual amount |

When the ink was analyzed by plasma emission spectral analysis, the content of alkali metals in the ink was 932 ppm. Further, pH value was 9.8.

When the above-mentioned ink was tested in like manner as in Example 1 (non alkali glass substrate was used in place of Pyrex glass #7740), in the initial printing test, clear images having an image concentration of 1.2 or more were also obtained on any of the papers. A normal printing could be carried out at printing after stopping printing without using any restoration procedure. In the liquid contact property of silicon, the variation of the thickness of non alkali glass substrate (OA-10B manufactured by Nippon Electric Glass Co., Ltd.) was 0.31 μm, the variation amount of the thickness of silicon was about 0.18 μm at (100) plane, about 0.08 μm at (110) plane, and about 0.08 μm at (111) plane, and the variation amount of the thickness was no problem as the liquid chamber, the fluid resistance part and the nozzles. Further, the variation amount of the thickness of the silicon oxide film at (110) plane was about 4 Å, and the variation amount of the thickness was no problem as the vibration plate.

Example 12

The under-mentioned dispersion liquid in place of the cyan dye of Example 3 was added by 20%, the mixture of the same prescription as in Example 3 except that the under-mentioned cationic compound was used as the corrosion inhibitor was continued to be stirred at 50° C. for 4 hours and cooled, and then filtration was carried out by a filter having a pore diameter of 0.8 μm.

<Dispersion Liquid>

| | |
|---|---|
| C.I. Pigment Yellow 138 (mean particle diameter: 96 nm) | 25% |
| Dispersant (polycondensate of naphthalene sulfonic acid salt with formalin) | 8% |
| Aqueous ammonia | 1.3% |
| Ethylene glycol | 25% |
| Water | residual amount |

<Corrosion Inhibitor>
Cation Polymer (Manufactured by Nippon Shokubai Co., Ltd.)

When the ink was analyzed by plasma emission spectral analysis, the content of alkali metals in the ink was 886 ppm. Further, pH value was 9.1.

When the above-mentioned ink was tested in like manner as in Example 1, in the initial printing test, clear images having an image concentration of 0.9 or more were also obtained on any of the papers. A normal printing could be carried out at printing after stopping printing without using any restoration procedure. In the liquid contact property of silicon, the variation amount of the thickness of silicon was about 0.29 μm at (100) plane, about 0.13 μm at (110) plane, and about 0.10 μm at (111) plane, and the variation amount of the thickness was no problem as the liquid chamber, the fluid resistance part and the nozzle. Further, the variation amount of the thickness of the silicon oxide film at (110) plane was about 5 Å, and the variation amount of the thickness was no problem as the vibration plate.

Example 13

The mixture of the same prescription as in Example 2 except that the under-mentioned dispersing liquid was added by 15% in place of the black dye of Example 2 as cyan pigment was continued to be stirred at 50° C. for 4 hours and cooled, and then filtration was carried out by a filter having a pore diameter of 0.8 μm.

| | |
|---|---|
| C.I. Pigment Blue 15:3 (phthalocyanine blue) (mean particle diameter: 123 nm) | 20% |
| Dispersant (artimonium polyoxyethylene oleyl ether sulfate) | 6.6% |
| Ethylene glycol | 30% |
| Water | residual amount |

When the ink was analyzed by plasma emission spectral analysis, the content of alkali metals in the ink was 33 ppm. Further, pH value was 9.7. When the above-mentioned ink was tested in like manner as in Example 2, in the initial printing test, clear images having an image concentration of 1.2 or more were also obtained on any of the papers. A normal printing could be carried out at printing after stopping printing without using any restoration procedure. In the liquid contact property, the variation of the thickness of Pyrex glass #7740 was 0.22 μm, the variation amount of the thickness of silicon was about 0.19 μm at (100) plane, about 0.08 μm at (110) plane, and about 0.05 μm at (111) plane, and the variation amount of the thickness was no problem as the liquid chamber, the fluid resistance part and the nozzle. Further, the variation amount of the thickness of the silicon oxide film at (110) plane was about 4 Å, and the variation amount of the thickness was no problem as the vibration plate.

Example 14

The mixture of the same prescription as in Example 4 except that the under-mentioned dispersing liquid was added by 20% in place of the cyan dye of Example 4 was continued to be stirred at 50° C. for 4 hours and cooled, and then filtration was carried out by a filter having a pore diameter of 0.8 μm.

| | |
|---|---|
| C.I. Pigment Yellow 138 (mean particle diameter: 96 nm) | 25% |
| Dispersant (dipolyoxyethylene nonylphenyl ether phosphoric acid) | 10% |
| Aqueous ammonia | 1.3% |
| Ethylene glycol | 25% |
| Water | residual amount |

When the ink was analyzed by plasma emission spectral analysis, the content of alkali metals in the ink was 88 ppm. Further, pH value was 9.1. When the above-mentioned ink was tested in like manner as in Example 2, in the initial printing test, clear images having an image concentration of 0.9 or more were also obtained on any of the papers. A normal printing could be carried out at printing after stopping printing without using any restoration procedure. In the liquid contact property, the variation of the thickness of Pyrex glass #7740 was 0.38 μm, the variation amount of the thickness of silicon was about 0.30 μm at (100) plane, about 0.13 μm at (110) plane, and about 0.10 μm at (111) plane, and the variation amount of the thickness was no problem as the liquid chamber, the fluid resistance part and the nozzles. Further, the variation amount of the thickness of the silicon oxide film at (110) plane was about 5 Å, and the variation amount of the thickness was no problem as the vibration plate.

Example 15

The mixture of the same prescription as in Example 6 except that the under-mentioned dispersing liquid was added by 12% in place of the yellow dye of Example 6 as a cyan pigment was continued to be stirred at 50° C. for 4 hours and cooled, and then filtration was carried out by a filter having a pore diameter of 0.8 μm.

| | |
|---|---|
| C.I. Pigment Red 122 (mean particle diameter: 120 nm) | 33% |
| Dispersant (dipolyoxyethylene nonylphenyl ether phosphoric acid) | 17.5% |
| Corrin | 1.5% |
| Ethyleneglycol | 25% |
| Water | residual amount |

When the ink was analyzed by plasma emission spectral analysis, the content of alkali metals in the ink was 57 ppm. Further, pH value was 9.7. When the above-mentioned ink was tested in like manner as in Example 2, in the initial printing test, clear images having an image concentration of 1.1 or more were also obtained on any of the papers. A normal printing could be carried out at printing after stopping printing without using any restoration procedure. In the liquid contact property, the variation of the thickness of Pyrex glass #7740 was 0.32 μm, the variation amount of the thickness of silicon was about 0.24 μm at (100) plane, about 0.11 μm at (110) plane, and about 0.08 μm at (111) plane, and the variation amount of the thickness was no problem as the liquid chamber, the fluid resistance part and the nozzle. Further, the variation amount of the thickness of the silicon oxide film at (110) plane was about 5 Å, and the variation amount of the thickness was no problem as the vibration plate.

Example 16

The under-mentioned coloring material was used in place of the black dye of Example 1 as a cationic yellow dye, the ink of the under-mentioned prescription excluding tetrabutylphosphonium hydroxide was used, and the mixture was continued to be stirred at 50° C. for 4 hours in like manner as in Example 1 and cooled, and then filtration was carried out by a filter having a pore diameter of 0.3 μm.

| | |
|---|---|
| Cationic yellow dye: KAYAKURYL ED (manufactured by Nippon Kayaku Co., Ltd.) | 3% by weight |
| Glycerin | 5% by weight |
| Ethylene glycol | 20% by weight |
| 2-ethyl-1,3-hexanediol | 2.0% by weight |
| SANPAC AP (fungicide manufactured by San-al Oil Co., Ltd.) | 0.4% by weight |
| Ion exchange water | residual amount |
| <Corrosion inhibitor> | |
| Cationic surfactant: CATION G-50 (benzalkonium chloride manufactured by Sanyo Chemical Co., Ltd.) | 1.0% by weight |

When the ink was analyzed by plasma emission spectral analysis, the content of alkali metals in the ink was 886 ppm. Further, pH value was 9.1.

When the above-mentioned ink was tested in like manner as in Example 1, in the initial printing test, clear images having an image concentration of 1.2 or more were also obtained on any of the papers. A normal printing could be carried out at printing after stopping printing without using any restoration procedure. In the liquid contact property of silicon, the variation amount of the thickness of silicon was about 0.19 μm at (100) plane, about 0.11 μm at (110) plane, and about 0.12 μm at (111) plane, and the variation amount of the thickness was no problem as the liquid chamber, the fluid resistance part and the nozzle. Further, the variation amount of the thickness of the silicon oxide film at (110)

plane was about 5 Å, and the variation amount of the thickness was no problem as the vibration plate.

Example 17

The under-mentioned coloring material was used in place of the black dye of Example 1 as a cationic magenta dye, the ink of the under-mentioned prescription excluding tetrabutylphosphonium hydroxide was used, and the mixture was continued to be stirred at 50° C. for 4 hours in like manner as in Example 1 and cooled, and then filtration was carried out by a filter having a pore diameter of 0.3 µm.

| | |
|---|---|
| Cationic magenta dye: KAYAKURYL ED (manufactured by Nippon Kayaku Co., Ltd.) | 3% by weight |
| Glycerin | 5% by weight |
| Ethylene glycol | 20% by weight |
| OLFIN E1010 | 1.0% by weight |
| SANPAC AP (fungicide manufactured by San-ai Oil Co., Ltd.) | 0.4% by weight |
| Ion exchange water | residual amount |

When the ink was analyzed by plasma emission spectral analysis, the content of alkali metals in the ink was 958 ppm. Further, pH value was 9.7.

When the above-mentioned ink was tested in like manner as in Example 1 (blue glass was used in place of Pyrex glass #7740), in the initial printing test, clear images having an image concentration of 1.1 or more were also obtained on any of the papers. A normal printing could be carried out at printing after stopping printing without using any restoration procedure. In the liquid contact property, the variation of the thickness of the blue glass (soft glass manufactured by HOYA Co., Ltd.) was 0.21 µm, the variation amount of the thickness of silicon was about 0.25 µm at (100) plane, about 0.11 µm at (110) plane, and about 0.08 µm at (111) plane, and the variation amount of the thickness was no problem as the liquid chamber, the fluid resistance part and the nozzle. Further, the variation amount of the thickness of the silicon oxide film at (110) plane was about 5 Å, and the variation amount of the thickness was no problem as the vibration plate.

Example 18

The under-mentioned coloring material was used in place of the black dye of Example 1 as a micro capsulated carbon black, the ink of the under-mentioned prescription excluding tetrabutylphosphonium hydroxide was used, and the mixture was continued to be stirred at 50° C. for 4 hours in like manner as in Example 1 and cooled, and then filtration was carried out by a filter having a pore diameter of 0.3 µm.

| | |
|---|---|
| Micro capsulated carbon black (mean particle diameter: 110 nm) (manufactured by Dainippon Ink and Chemicals Co., Ltd.) | 5% by weight |
| Glycerin | 5% by weight |
| Ethylene glycol | 20% by weight |
| OLEFIN E1010 | 1.0% by weight |
| SANPAC AP (fungicide manufactured by San-ai Oil Co., Ltd.) | 0.4% by weight |
| Ion exchange water | residual amount |

When the ink was analyzed by plasma emission spectral analysis, the content of alkali metals in the ink was 156 ppm. Further, pH value was 9.7.

When the above-mentioned ink was tested in like manner as in Example 1 (photosensitive glass (manufactured by HOYA Co., Ltd.) was used in place of Pyrex glass #7740), in the initial printing test, clear images having an image concentration of 1.0 or more were also obtained on any of the papers. A normal printing could be carried out at printing after stopping printing without using any restoration procedure. In the liquid contact property, the variation of the thickness of the photosensitive glass (manufactured by HOYA Co., Ltd.) was 0.21 µm, the variation amount of the thickness of silicon was about 0.26 µm at (100) plane, about 0.10 µm at (110) plane, and about 0.06 µm at (111) plane, and the variation amount of the thickness was no problem as the liquid chamber, the fluid resistance part and the nozzles. Further, the variation amount of the thickness of the silicon oxide film at (110) plane was about 4 Å, and the variation amount of the thickness was no problem as the vibration plate.

Example 19

The mixture of the same prescription as in Example 1 except that a dye in which after the portion of alkali metals of Project Fast Yellow 2 (manufactured by Avecia Co., Ltd.) in place of the black dye of Example 1 as a yellow dye was once made as a free acid, it was partially substituted with the tetrabutylphosphonium compound of (Formula 3) was added by 3%, was continued to be stirred at 50° C. for 4 hours in like manner as in Example 1 and cooled, and then filtration was carried out by a filter having a pore diameter of 0.8 µm. When the ink was analyzed by plasma emission spectral analysis, the content of alkali metals in the ink was 630 ppm. Further, pH value was 9.6.

When the above-mentioned ink was tested in like manner as in Example 1 (low alkali glass substrate was used in place of Pyrex glass #7740), in the initial printing test, clear images having an image concentration of 0.9 or more were also obtained on any of the papers. A normal printing could be carried out at printing after stopping printing without using any restoration procedure. In the liquid contact property, the variation of the thickness of the low alkali glass substrate (BLC manufactured by Nippon Electric Glass Co., Ltd.) was 0.21 µm, the variation amount of the thickness of silicon was about 0.40 µm at (100) plane, about 0.15 µm at (110) plane, and about 0.13 µm at (111) plane, and the variation amount of the thickness was no problem as the liquid chamber, the fluid resistance part and the nozzle. Further, the variation amount of the thickness of the silicon oxide film at (110) plane was about 6 Å, and the variation amount of the thickness was no problem as the vibration plate.

Comparative Example 11

A dye was prepared in like manner as in Example 18 and tested except that Project Fast Yellow 2 (manufactured by Avecia Co., Ltd.) which is not substituted to the tetrabutylphosphonium compound of (Formula 3) was added as a yellow dye in the ink prescription of Example 17.

When the ink was analyzed by plasma emission spectral analysis, the content of alkali metals in the ink was 1150 ppm. Further, pH value was 9.6. The ink was filled in the printer in like manner as in Example 1, and the printing test and preservation test were carried out. An initial image which is similar as in Example 1 was obtained by the ink, but in the injection response test after stopping printing, since the dissolution stability of the dye becomes worse caused by the elution of silicon to the ink, the discharge inferiority occurred at 19/48 nozzles. In the liquid contact property, the variation of the thickness of the low alkali glass substrate (BLC manufactured by Nippon Electric Glass Co., Ltd.) was 13.9 μm, the variation amount of the thickness of silicon was about 10.2 μm at (100) plane, about 5.1 μm at (110) plane, and about 0.90 μm at (111) plane, and it was the variation amount which generates the precision problem as the liquid chamber, the fluid resistance part and the nozzles. Further, all of the silicon oxide film at (110) plane was eluted, and since the vibration plates of 3/48 were made thin, they cannot endure the vibration and were destroyed.

Example 20

The mixture of the same prescription as in Example 2 except that a dye in which after the portion of alkali metals of Project Fast Yellow 2 (manufactured by Avecia Co., Ltd.) in place of the black dye of Example 2 as a yellow dye was once made as a free acid, it was partially substituted with corrin was added by 3%, was continued to be stirred at 50° C. for 4 hours and cooled, and then filtration was carried out by a filter having a pore diameter of 0.8 μm. When the ink was analyzed by plasma emission spectral analysis, the content of alkali metals in the ink was 620 ppm. Further, pH value was 9.6. When the above-mentioned ink was tested in like manner as in Example 2 (low alkali glass substrate was used in place of Pyrex glass #7740), in the initial printing test, clear images having an image concentration of 0.9 or more were also obtained on any of the papers. A normal printing could be carried out at printing after stopping printing without using any restoration procedure. In the liquid contact property, the variation of the thickness of Pyrex glass #7740 was 0.43 μm, the variation amount of the thickness of silicon was about 0.40 μm at (100) plane, about 0.15 μm at (110) plane, and about 0.12 μm at (111) plane, and the variation amount of the thickness was no problem as the liquid chamber, the fluid resistance part and the nozzle. Further, the variation amount of the thickness of the silicon oxide film at (110) plane was about 6 Å, and the variation amount of the thickness was no problem as the vibration plate.

Comparative Example 12

A dye was prepared in like manner as in Example 20 and tested except that Project Fast Yellow 2 (manufactured by Avecia Co. , Ltd.) which is not substituted to corrin was added as a yellow dye in the ink prescription of Example 20. When the ink was analyzed by plasma emission spectral analysis, the content of alkali metals in the ink was 1150 ppm. Further, pH value was 9.6. The ink was filled in the printer in like manner as in Example 10, and the printing test and preservation test were carried out. An initial image which is similar as in Example 10 was obtained by the ink, but in the injection response test after stopping printing, since the dissolution stability of the dye becomes worse caused by the elution of silicon to the ink, the discharge inferiority occurred at 19/48 nozzles. In the liquid contact property, the variation of the thickness of Pyrex glass #7740 was 14.3 μm the variation amount of the thickness of silicon was about 10.2 μm at (100) plane, about 5.1 μm at (110) plane, and about 0.90 μm at (111) plane, and it was the variation amount which generates the precision problem as the liquid chamber, the fluid resistance part and the nozzle. Further, all of the silicon oxide film at (110) plane was eluted, and since the vibration plates of 3/48 were made thin, they cannot endure the vibration and were destroyed.

Example 21

Test was carried out in like manner as in Example 2 except that the ink was filled in an ink jet printer of the under-mentioned conditions having a system in which the vibration plate is deformed to discharge by electrostatic force in which the liquid chamber, the nozzles and the fluid resistance are composed of Pyrex glass #7740 and silicon of (100) plane, (110) plane and (111) plane, and the vibration plate is composed of Pyrex glass #7740, in place of the ink jet printer of Example 2.
Drive frequency: 10 KHz
Drive voltage: 23V
Nozzle diameter: 45 μm
Volume of liquid drops: 35 pl/dot
Nozzle number: 48 nozzles
Dot density: 300 dpi In the initial printing test, clear images having an image concentration of 1.3 or more were also obtained on any of the papers. A normal printing could be carried out at printing after stopping printing without using any restoration procedure. In the liquid contact property, the variation of the thickness of Pyrex glass #7740 was 0.1 μm, the variation amount of the thickness of silicon was about 0.16 μm at (100) plane, about 0.06 μm at (110) plane, and about 0.04 μm at (111) plane, and the variation amount of the thickness was no problem as the liquid chamber, the fluid resistance part and the nozzles.

Example 22

Test was carried out in like manner as in Example 2 except that the ink was filled in an ink jet printer of the under-mentioned conditions having a thermal system in which the liquid chamber and the fluid resistance are composed of Pyrex glass #7740 and silicon of (100) plane, (110) plane and (111) plane, and the nozzles are composed of a Ni substrate of eutectoid plating of PTFE, in place of the ink jet printer of Example 2.
Drive frequency: 10 KHz
Drive voltage: 20V
Nozzle diameter: 30 μm
Volume of liquid drops: 24 pl/dot
Nozzle number: 96 nozzles
Dot density: 240 dpi In the initial printing test, clear images having an image concentration of 1.3 or more were also obtained on any of the papers. A normal printing could be carried out at printing after stopping printing without using any restoration procedure. In the liquid contact property, the variation of the thickness of Pyrex glass #7740 was 0.15 μm, the variation amount of the thickness of silicon was about 0.16 μm at (100) plane, about 0.06 μm at (110) plane, and about 0.04 μm at (111) plane, and the variation amount of the thickness was no problem as the liquid chamber, the fluid resistance part and the nozzles. Further, since the elution can make the pH of Ni alkaline side at a neutral region, there was no elution of Ni which becomes a level in which a problem occurs as the nozzles.

As clarified from the detailed and specific illustrations above, according to the configurations described in the first to ninth aspects, there can be provided an ink in which even if the content of alkali metals in the ink is 800 ppm or more, since a phosphonium ion, an acetylene compound, and a cationic compound are contained, they are adsorbed and remain on the surface of a borosilicate glass, asodalime glass, a photosensitive glass, single crystal silicon, polysilicon, a silicon oxide film, a titanium nitride film, a zirconium film, a titanium oxide film, and a silicon nitride film which are contained in the printer, therefore the continuous elution of a glass and silicon can be prevented, problems such as the lowering of the image quality caused by the fluctuations of the size of ink drops caused by the lowering of the design precision of the printer and the discharge speed of the ink drops, the occurrence of the discharge inferiority, and troubles caused by the lowering of the bonding strength of the conjunction part can be prevented, and the clogging caused by the elution of a glass and silicon to the ink is prevented.

According to the configurations described in the tenth to fourteenth aspects, there can be provided an ink jet recording method by which the content of alkali metals in the ink is 700 ppm or less, and a prescribed amount or more of the phosphonium ion, the acetylene compound, and the cationic compound represented by the above-mentioned general formula (Formula 1) are contained, therefore the elution of a glass, silicon and silicon oxide and the like which are used in the printer can be suppressed, problems such as the lowering of the image quality caused by the fluctuations of the size of ink drops caused by the lowering of the design precision of the printer and the discharge speed of the ink drops, the occurrence of the discharge inferiority, and troubles caused by the lowering of the bonding strength of the conjunction part are prevented, and the clogging caused by the elution of a glass and silicon to the ink is prevented.

According to the configuration described in the fifteenth aspect, since the content of alkali metals in the ink is 700 ppm or less, there can be provided an ink in which the elution of a glass can be prevented, problems such as the lowering of the image quality caused by the fluctuations of the size of ink drops caused by the lowering of the design precision of the printer and the discharge speed of the ink drops, the occurrence of the discharge inferiority, and troubles caused by the lowering of the bonding strength of the conjunction part are prevented, and the clogging caused by the elution of silicon to the ink is prevented.

According to the configuration described in the sixteenth aspect, since the action of also suppressing the elution of silicon and silicon oxide is exhibited, there can be provided an ink in which even the ink jet printer in which silicon and silicon oxide are used for heads together with a glass prevents problems such as the lowering of the image quality caused by the fluctuations of the size of ink drops caused by the lowering of the design precision of the printer and the discharge speed of the ink drops, the occurrence of the discharge inferiority, and troubles caused by the lowering of the bonding strength of the conjunction part, and prevents the clogging caused by the elution of silicon to the ink.

According to the configuration described in the seventeenth aspect, since the compound of the above-mentioned formula (A) exhibits the action of suppressing the elution of silicon and silicon oxide, there can be provided an ink in which since a prescribed amount or more of the compound is contained, the elution of a glass, silicon and silicon oxide is further suppressed.

According to the configuration described in the eighteenth aspect, an ink having the superior prevention effect of the elution of a glass, silicon and silicon oxide can be provided by specifying the structure the compound of the above-mentioned formula (A) to corrin.

According to the configuration described in the nineteenth aspect, an ink having the superior prevention effect of the elution of a glass, silicon and silicon oxide can be provided by specifying the structure the compound of the above-mentioned formula (A) to triethanol amine.

According to the configuration described in the twentieth aspect, an ink having the superior prevention effect of the elution of a glass, silicon and silicon oxide can be provided by specifying the structure the compound of the above-mentioned formula (A) to tetramethylammonium.

According to the configuration described in the twenty-first aspect, an ink having the superior prevention effect of the elution of a glass, silicon and silicon oxide can be provided by specifying the structure the compound of the above-mentioned formula (A) to an ammonium ion.

According to the configuration described in the twenty-second aspect, since the elution of a glass and silicon of the liquid chamber member in which precision is required can be suppressed, a desired volume of the liquid chamber can be maintained without enlarging the volume of the liquid chamber, therefore an ink of preventing the lowering of the image quality caused by the fluctuations of the size of ink drops and the occurrence of the discharge inferiority can be provided.

According to the configuration described in the twenty-third aspect, since the elution of a glass and silicon of the fluid resistance part in which precision is required can be suppressed, the fluid resistance can be maintained without fluctuation of the fluid resistance, therefore an ink of preventing the lowering of the image quality caused by the fluctuations of the size of ink drops and the occurrence of the discharge inferiority can be provided.

According to the configuration described in the twenty-fourth aspect, since the elution of a glass and silicon of the vibration plate in which precision is required can be suppressed, a desired thickness of the vibration plate can be maintained without reducing the thickness of the vibration plate, therefore an ink of preventing the lowering of the image quality caused by the fluctuations of the size of ink drops, the occurrence of the discharge inferiority and the damage of the vibration plate can be provided.

According to the configuration described in the twenty-fifth aspect, since the elution of a glass and silicon of the nozzles in which precision is required can be suppressed, a desired diameter of the nozzles can be maintained without magnifying the diameter of the nozzles, therefore an ink of preventing the lowering of the image quality caused by the fluctuations of the size of ink drops and the occurrence of the discharge inferiority can be provided.

Further, according to the configuration described in the twenty-sixth aspect, since the elution of a glass and silicon of the liquid chamber member in which precision is required can be suppressed, a desired volume of the liquid chamber can be maintained without enlarging the volume of the liquid chamber, therefore an ink jet recording method of preventing the lowering of the image quality caused by the fluctuations of the size of ink drops and the occurrence of the discharge inferiority can be provided.

According to the configuration described in the twenty-seventh aspect, since the elution of a glass and silicon of the fluid resistance part in which precision is required can be suppressed, the fluid resistance can be maintained without fluctuation of the fluid resistance, therefore an ink jet recording method of preventing the lowering of the image quality caused by the fluctuations of the size of ink drops and the occurrence of the discharge inferiority can be provided.

According to the configuration described in the twenty-eighth aspect, since the elution of a glass and silicon of the vibration plate in which precision is required can be suppressed, a desired thickness of the vibration plate can be maintained without reducing the thickness of the vibration plate, therefore an ink jet recording method of preventing the lowering of the image quality caused by the fluctuations of the size of ink drops, the occurrence of the discharge inferiority and the damage of the vibration plate can be provided.

According to the configuration described in the twenty-ninth aspect, since the elution of a glass and silicon of the nozzles in which precision is required can be suppressed, a desired diameter of the nozzles can be maintained without magnifying the diameter of the nozzles, therefore an ink jet recording method of preventing the lowering of the image quality caused by the fluctuations of the size of ink drops and the occurrence of the discharge inferiority can be provided.

According to the configuration described in the thirtieth aspect, since the liquid chamber member, the fluid resistance part, the vibration plate and the nozzles in which precision is required can be processed by an etching treatment, a sandblast treatment, an excimer laser processing and drilling method, an ink jet recording method not having the lowering of the image quality and the occurrence of the discharge inferiority can be provided.

According to the configuration described in the thirty-first aspect, since the content of alkali metals in the ink is 700 ppm or less, there can be provided an ink jet recording method by which the elution of a glass which is used in the printer can be suppressed, and problems such as the lowering of the image quality caused by the fluctuations of the size of ink drops caused by the lowering of the design precision of the printer and the discharge speed of the ink drops, the occurrence of the discharge inferiority, and troubles caused by the lowering of the bonding strength of the conjunction part are prevented, and the clogging caused by the elution of silicon to the ink is prevented.

According to the configuration described in the thirty-second aspect, since the action of also suppressing the elution of silicon and silicon oxide is exhibited, there can be provided an ink jet recording method by which even the ink jet printer in which silicon and silicon oxide are used for heads together with a glass prevents problems such as the lowering of the image quality caused by the fluctuations of the size of ink drops caused by the lowering of the design precision of the printer and the discharge speed of the ink drops, the occurrence of the discharge inferiority, and troubles caused by the lowering of the bonding strength of the conjunction part, and prevents the clogging caused by the elution of silicon to the ink.

According to the configuration described in the thirty-third aspect, since the compound of the above-mentioned formula (A) exhibits the action of suppressing the elution of a glass, silicon and silicon oxide, there can be provided an ink jet recording method in which since a prescribed amount or more of the compound is contained, the elution of a glass, silicon and silicon oxide is further suppressed.

According to the configuration described in the thirty-fourth aspect, an ink jet recording method having the superior prevention effect of the elution of a glass, silicon and silicon oxide can be provided by specifying the structure the compound of the above-mentioned formula (A) to corrin.

According to the configuration described in the thirty-fifth aspect, an ink jet recording method having the superior prevention effect of the elution of a glass, silicon and silicon oxide can be provided by specifying the structure the compound of the above-mentioned formula (A) to triethanol amine.

According to the configuration described in the thirty-sixth aspect, an ink jet recording method having the superior prevention effect of the elution of a glass, silicon and silicon oxide can be provided by specifying the structure the compound of the above-mentioned formula (A) to tetramethylammonium.

According to the configuration described in the thirty-seventh aspect, an ink jet recording method having the superior prevention effect of the elution of a glass, silicon and silicon oxide can be provided by specifying the structure the compound of the above-mentioned formula (A) to an ammonium ion.

According to the configuration described in the thirty-eighth aspect, since the elution of a glass and silicon of the liquid chamber member in which precision is required can be suppressed, a desired volume of the liquid chamber can be maintained without enlarging the volume of the liquid chamber, therefore an ink jet recording method of preventing the lowering of the image quality caused by the fluctuations of the size of ink drops and the occurrence of the discharge inferiority can be provided.

According to the configuration described in the thirty-ninth aspect, since the elution of a glass and silicon of the fluid resistance part in which precision is required can be suppressed, the fluid resistance can be maintained without fluctuation of the fluid resistance, therefore an ink jet recording method of preventing the lowering of the image quality caused by the fluctuations of the size of ink drops and the occurrence of the discharge inferiority can be provided.

According to the configuration described in the fortieth aspect, since the elution of a glass and silicon of the vibration plate in which precision is required can be suppressed, a desired thickness of the vibration plate can be maintained without reducing the thickness of the vibration plate, therefore an ink jet recording method of preventing the lowering of the image quality caused by the fluctuations of the size of ink drops, the occurrence of the discharge inferiority and the damage of the vibration plate can be provided.

According to the configuration described in the forty-first aspect, since the elution of a glass and silicon of the nozzles in which precision is required can be suppressed, a desired diameter of the nozzles can be maintained without magnifying the diameter of the nozzles, therefore an ink jet recording method of preventing the lowering of the image quality caused by the fluctuations of the size of ink drops and the occurrence of the discharge inferiority can be provided.

According to the configurations described in the forty-second to forty-fourth aspects, a recording liquid cartridge which stored an ink in which the elution of a glass, silicon and silicon oxide and the like which are used in the printer can be thus suppressed, problems such as the lowering of the image quality caused by the fluctuations of the size of ink drops caused by the lowering of the design precision of the printer and the discharge speed of the ink drops, the occurrence of the discharge inferiority, and troubles caused by the lowering of the bonding strength of the conjunction part are prevented, and the clogging caused by the elution of silicon to the ink is prevented; a recording unit; and a recording apparatus can be provided.

The present document incorporates by reference the entire contents of Japanese priority documents, 2000-299728 filed in Japan on Sep. 29, 2000, and 2001-003082 filed in Japan on Jan. 1, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An ink for ink jet recording used for an ink jet printer in which at least a portion of a member being in contact with the ink is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, wherein the total of the content of alkali metals in the ink is 700 ppm or less, and 30% or more of a phosphonium ion represented by Formula 1 based on the equivalent of an anionic compound which is contained in the ink is contained:

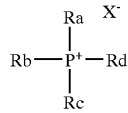

wherein Ra, Rb, Rc and Rd represent a linear, branched, or cyclic alkyl group having 1 to 4 carbon atoms, a hydroxyalkyl group, a halogenated alkyl group and a substituted or non-substituted phenyl group, and $X^-$ represents a counter ion.

2. The ink for ink jet recording according to claim 1, wherein pH of the ink is within a range of 7 to 10.

3. The ink for ink jet recording according to claim 1, used for an ink jet printer in which at least a portion of a liquid chamber member is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film.

4. The ink for ink jet recording according to claim 1, used for an ink jet printer in which at least a portion of the member of a fluid resistance part is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film.

5. The ink for ink jet recording according to claim 1, used for an ink jet printer in which at least a portion of the member of a vibration plate is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film.

6. The ink for ink jet recording according to claim 1, used for an ink jet printer in which at least a portion of the member of a nozzle is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film.

7. An ink jet recording method carrying out recording using an ink jet printer in which at least a portion of a liquid chamber member is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, and the ink for ink jet recording used for an ink jet printer in which at least a portion of a member being in contact with the ink is formed by any one of a borosilicate glass, a soda lime glass, a photosensitive glass, single crystal silicon, polysilicon, a silicon nitride film, a zirconium film, a titanium oxide film, and a silicon nitride film, wherein the total of the content of alkali metals in the ink is 700 ppm or less, and 30% or more of a phosphonium ion represented by Formula 1 based on the equivalent of an anionic compound which is contained in the ink is contained

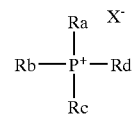

wherein Ra, Rb, Rc and Rd represent a linear, branched, or cyclic alkyl group having 1 to 4 carbon atoms, a hydroxyalkyl group, a halogenated alkyl group and a substituted or non-substituted phenyl group, and $X^-$ represents a counter ion.

8. An ink jet recording method according to claim 7, using an ink jet printer in which a groove is formed by treating the liquid chamber member, the fluid resistance part, the vibration plate or the nozzle by an etching treatment, a sandblast treatment, an excimer laser processing or drilling.

9. An ink jet recording method carrying out recording using an ink jet printer in which at least a portion of the member of a fluid resistance part is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, and the ink for ink jet recording used for an ink jet printer in which at least a portion of a member being in contact with the ink is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, wherein the total of the content of alkali metals in the ink is 700 ppm or less, and 30% or more of a phosphonium ion represented by Formula 1 based on the equivalent of an anionic compound which is contained in the ink is contained $$\begin{array}{c} \text{Ra} \quad X^- \\ | \\ \text{Rb}-\text{P}^+-\text{Rd} \\ | \\ \text{Rc} \end{array}$$

wherein Ra, Rb, Rc and Rd represent a linear, branched or cyclic alkyl group having 1 to 4 carbon atoms, a hydroxyalkyl group, a halogenated alkyl group and a substituted or non-substituted phenyl group, and $X^-$ represents a counter ion.

10. An ink jet recording method according to claim 9, using an ink jet printer in which a groove is formed by treating the liquid chamber member, the fluid resistance part, the vibration plate or the nozzle by an etching treatment, a sandblast treatment, an excimer laser processing or drilling.

11. An ink jet recording method carrying out recording using an ink jet printer in which at least a portion of the member of a vibration plate is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, and the ink for ink jet recording used for an ink jet printer in which at least a portion of a member being in contact with the ink is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, wherein the total of the content of alkali metals in the ink is 700 ppm or less, and 30% or more of a phosphonium ion represented by Formula 1 based on the equivalent of an anionic compound which is contained in the ink is contained

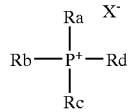

wherein Ra, Rb, Rc and Rd represent a linear, branched, or cyclic alkyl group having 1 to 4 carbon atoms, a hydroxyalkyl group, a halogenated alkyl group and a substituted or non-substituted phenyl group, and X⁻ represents a counter ion.

12. An ink jet recording method according to claim 11, using an ink jet printer in which a groove is formed by treating the liquid chamber member, the fluid resistance part, the vibration plate or the nozzle by an etching treatment, a sandblast treatment, an excimer laser processing or drilling.

13. An ink jet recording method carrying out recording using an ink jet printer in which at least a portion of the member of a nozzle is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, and the ink for ink jet recording used for an ink jet printer in which at least a portion of a member being in contact with the ink is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, wherein the total of the content of alkali metals in the ink is 700 ppm or less, and 30% or more of a phosphonium ion represented by Formula 1 based on the equivalent of an anionic compound which is contained in the ink is contained

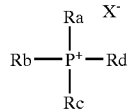

wherein Ra, Rb, Rc and Rd represent a linear, branched, or cyclic alkyl group having 1 to 4 carbon atoms, a hydroxyalkyl group, a halogenated alkyl group and a substituted or non-substituted phenyl group, and X⁻ represents a counter ion.

14. An ink jet recording method according to claim 13, using an ink jet printer in which a groove is formed by treating the liquid chamber member, the fluid resistance pail, the vibration plate or the nozzle by an etching treatment, a sandblast treatment, an excimer laser processing or drilling.

15. A recording liquid cartridge equipped with a recording liquid storing part which stores a recording liquid, wherein the recording liquid is a recording liquid used for an ink jet printer in which at least a portion of a member being in contact with the ink is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, wherein the total of the content of alkali metals in the ink is 700 ppm or less, and 30% or more of a phosphonium ion represented by Formula 1 based on the equivalent of an anionic compound which is contained in the ink is contained

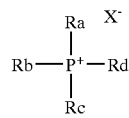

wherein Ra, Rb, Rc and Rd represent a linear, branched, or cyclic alkyl group having 1 to 4 carbon atoms, a hydroxyalkyl group, a halogenated alkyl group and a substituted or non-substituted phenyl group, and X⁻ represents a counter ion.

16. An ink jet recording method according to claim 15, using an ink jet printer in which a groove is formed by treating the liquid chamber member, the fluid resistance part, the vibration plate or the nozzle by an etching treatment, a sandblast treatment, an excimer laser processing or drilling.

17. A recording liquid cartridge equipped with a recording liquid storing part which stores a recording liquid, and a head part for discharging the drops of recording liquid, wherein the recording liquid is a recording liquid used for an ink jet printer in which at least a portion of a member being in contact with the ink is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, wherein the total of the content of alkali metals in the ink is 700 ppm or less, and 30% or more of a phosphonium ion represented by Formula 1 based on the equivalent of an anionic compound which is contained in the ink is contained

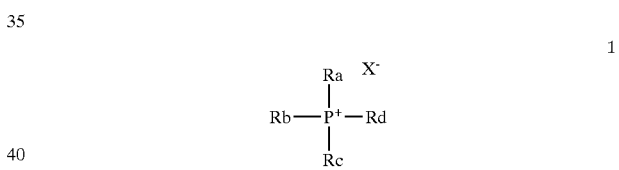

wherein Ra, Rb, Rc and Rd represent a linear, branched, or cyclic alkyl group having 1 to 4 carbon atoms, a hydroxyalkyl group, a halogenated alkyl group and a substituted or non-substituted phenyl group, and X⁻ represents a counter ion.

18. An ink jet recording method according to claim 17, using an ink jet printer in which a groove is formed by treating the liquid chamber member, the fluid resistance part, the vibration plate or the nozzle by an etching treatment, a sandblast treatment, an excimer laser processing or drilling.

19. An inkjet recording apparatus equipped with a recording liquid cartridge having a recording liquid storing part which stores a recording liquid, and a head part for discharging the drops of recording liquid, wherein the recording liquid is a recording liquid used for an ink jet printer in which at least a portion of a member being in contact with the ink is formed by any one of a borosilicate glass, a soda lime glass, a photosensitive glass, single crystal silicon, polysilicon, a silicon oxide film, a titanium nitride film, a zirconium film, a titanium oxide film, and a silicon nitride film, wherein the total of the content of alkali metals in the ink is 700 ppm or less, and 30% or more of a phosphonium ion represented by Formula 1 based on the equivalent of an anionic compound which is contained in the ink is contained

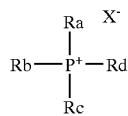

wherein Ra, Rb, Rc and Rd represent a linear, branched, or cyclic alkyl group having 1 to 4 carbon atoms, a hydroxyalkyl group, a halogenated alkyl group and a substituted or non-substituted phenyl group, and X⁻ represents a counter ion.

20. An ink jet recording method according to claim 19, using an ink jet printer in which a groove is formed by treating the liquid chamber member, the fluid resistance part, the vibration plate or the nozzle by an etching treatment, a sandblast treatment, an excimer laser processing or drilling.

21. In an ink jet recording process comprising applying an ink to a substrate with an ink jet printer wherein at least a portion of the ink jet printer is in contact with the ink and comprises at least one of a borosilicate glass, a soda lime glass, a photosensitive glass, a single crystal silicon, polysilicon, a silicon oxide film, a titanium nitride film, a zirconium film, a titanium oxide film, or a silicon nitride film, wherein the improvement comprises applying an ink having an alkaline metal concentration of 700 ppm or less and wherein 30% or more of the anionic compounds present in the ink are one or more phosphonium ions represented by Formula 1

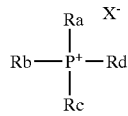

wherein Ra, Rb, Rc and Rd represent a linear, branched, or cyclic alkyl group having 1 to 4 carbon atoms, a hydroxyalkyl group, a halogenated alkyl group and a substituted or non-substituted phenyl group, and X⁻ represents a counter ion.

22. The ink jet recording process according to claim 21, wherein X⁻ is a hydroxyl ion.

23. The ink jet recording process according to claim 21, wherein the pH of the ink is from 7 to 10.

24. The ink jet recording process according to claim 21, wherein the portion in contact with the ink is a liquid chamber.

25. The ink jet recording process according to claim 21, wherein the portion of the ink jet printer is a fluid resistance part.

26. The ink jet recording process according to claim 21, wherein the portion of the ink jet printer is a vibration plate.

27. The ink jet recording process according to claim 21, wherein the portion of the ink jet printer is a nozzle.

28. An ink jet recording ink comprising a corrosion inhibitor and a phosphonium ion of Formula 1

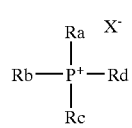

wherein Ra, Rb, Rc and Rd represent a linear, branched, or cyclic alkyl group having 1 to 4 carbon atoms, a hydroxyalkyl group, a halogenated alkyl group and a substituted or non-substituted phenyl group, and X⁻ represents a counter ion, and wherein the total content of alkali metals in the ink is 700 ppm or less and at least 30% of the phosphonium ion present in the ink is of Formula 1.

29. The ink jet recording ink according to claim 28, wherein the pH of the ink is within a range of 7 to 10.

* * * * *